United States Patent
Dvortsov et al.

(10) Patent No.: US 10,162,593 B2
(45) Date of Patent: Dec. 25, 2018

(54) COORDINATED HAND-OFF OF AUDIO DATA TRANSMISSION

(71) Applicant: Apple Inc., Cupertino, CA (US)

(72) Inventors: Eugene Dvortsov, San Francisco, CA (US); David J. Shoemaker, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/113,731

(22) PCT Filed: Jan. 22, 2014

(86) PCT No.: PCT/US2014/012544
§ 371 (c)(1),
(2) Date: Jul. 22, 2016

(87) PCT Pub. No.: WO2015/112137
PCT Pub. Date: Jul. 30, 2015

(65) Prior Publication Data
US 2017/0003931 A1 Jan. 5, 2017

(51) Int. Cl.
*G06F 3/16* (2006.01)
*H04W 4/80* (2018.01)
(Continued)

(52) U.S. Cl.
CPC ............. *G06F 3/165* (2013.01); *G11B 27/11* (2013.01); *G11B 27/36* (2013.01); *H04N 21/439* (2013.01);
(Continued)

(58) Field of Classification Search
None
See application file for complete search history.

(56) References Cited

U.S. PATENT DOCUMENTS

| 7,725,592 B1 | 5/2010 | Hasegawa et al. |
| 2002/0098878 A1* | 7/2002 | Mooney ............ G08B 1/08 455/569.1 |

(Continued)

FOREIGN PATENT DOCUMENTS

| CN | 101527746 A | 9/2009 |
| CN | 101594594 A | 12/2009 |

(Continued)

OTHER PUBLICATIONS

Springer, "Smooth Device Handover System for Seamless Audio Service." Convergence and Hybrid Information Technology, Lecture Notes in Computer Science vol. 6935, 2011. Downloaded Nov. 14, 2013. 2 pages (abstract and related content).

(Continued)

*Primary Examiner* — Curtis A Kuntz
*Assistant Examiner* — Kenny H Truong
(74) *Attorney, Agent, or Firm* — Kilpatrick Townsend and Stockton LLP

(57) ABSTRACT

Certain embodiments of the present invention can facilitate a smooth listening experience, during which a user can enjoy continuous music play despite moving between settings or using a device with restricted playing capabilities. While a first player device is playing songs from an audio collection, one or more other devices can be evaluated to determine whether one should take over the play. This determination can be made by comparatively evaluating properties of the other devices, such as their power source, battery charge (if applicable), network connection, access to a song, and/or device type. When a determination is made to transfer the play between devices, a message can be sent to the new player device that indicates when to begin play and which song to play. The first player device can cease playing (Continued)

substantially at the same time that the new player device begins play.

31 Claims, 9 Drawing Sheets

(51) Int. Cl.
    *H04W 8/00* (2009.01)
    *G11B 27/11* (2006.01)
    *G11B 27/36* (2006.01)
    *H04N 21/439* (2011.01)
    *H04N 21/442* (2011.01)

(52) U.S. Cl.
    CPC . *H04N 21/44227* (2013.01); *H04N 21/44231* (2013.01); *H04W 4/80* (2018.02); *H04W 8/005* (2013.01)

(56) References Cited

U.S. PATENT DOCUMENTS

| | | | |
|---|---|---|---|
| 2003/0073412 A1 | 4/2003 | Meade, II | |
| 2007/0203955 A1 | 8/2007 | Pomerantz | |
| 2010/0228758 A1* | 9/2010 | Lim | G11B 27/034 707/758 |
| 2010/0260348 A1* | 10/2010 | Bhow | H04N 21/25891 381/81 |
| 2012/0110425 A1 | 5/2012 | Kim | |
| 2014/0006587 A1* | 1/2014 | Kusano | H04N 21/41407 709/224 |
| 2014/0105561 A1* | 4/2014 | Chen | H04N 21/647 386/200 |
| 2015/0358666 A1* | 12/2015 | Atake | H04N 21/4122 725/88 |

FOREIGN PATENT DOCUMENTS

| | | |
|---|---|---|
| CN | 101998157 A | 3/2011 |
| CN | 102647632 A | 8/2012 |
| CN | 103385006 A | 11/2013 |
| EP | 2 226 972 A1 | 8/2010 |
| WO | 1995004437 A1 | 2/1995 |
| WO | 02/08948 A2 | 1/2002 |

OTHER PUBLICATIONS

Zolfagharifard, "Spotify announces "Connect" service that will let users change what they play their music on as they move in, out and around their house." Mail Online published Sep. 3, 2013. 4 pages.
International Search Report and Written Opinion dated Jun. 6, 2014 in PCT/US2014/012544. 13 pages.
International Application No. PCT/US2014/012544, International Preliminary Report on Patentability dated Aug. 4, 2016, 9 pages.
First Office Action mailed in Chinese Patent Application No. 201480073731.7 dated Aug. 21, 2018. 26 pages. English translation included.

* cited by examiner

COORDINATED HAND-OFF OF AUDIO DATA TRANSMISSION

BACKGROUND

The present disclosure relates generally to automated coordination between electronic devices and in particular to smoothly and automatically handing off play of a music collection between devices.

Electronic devices have transformed the ease with which individuals can listen to music. Years ago, bulky players and physical media were needed to play recorded songs. Now, songs can be played from mobile devices without use of physical media. Users of these devices can therefore enjoy music as they travel from location to location. However, music play can be interrupted as the device's battery drains or as strength of a network connection weakens.

Many mobile devices can play music such that a user can enjoy songs while moving about. Nevertheless, a mobile device's performance can, in time, degrade as its charge and/or network connection weakens. Further, maintained reliance on the mobile device can cause the user to sacrifice utilizing another music-player device associated with better sound quality (e.g., by being paired with better speakers), social inclusion (e.g., by being paired with speakers instead of headphones) and/or playing stability (e.g., charge). While a user can always choose to actively switch player devices, that itself can cause play interruption during the switch and a play position within an audio collection can be lost.

SUMMARY

In some embodiments, an audio collection that includes one or more songs can be identified at a first device. A determination can be made that the first device is a player device. Audio data from the audio collection can be transmitted from the first device to a speaker. A rule can be accessed at the first device. The rule can indicate whether another device is to take over as the player device. A determination can be made by the first device that a second device is to take over as the player device based on a property of the second device and the accessed rule. A characteristic of the transmission of the audio data from the audio collection to the speaker can be transmitted from the first device to the second device. Transmission from the first device to the speaker of the audio data from the audio collection can be ceased.

In some embodiments, a dynamic set of devices can be identified at a master device. Each of the dynamic set of devices can be within a same area and has the capability to transmit audio data to a speaker. The master device can identify a first device of the dynamic set of devices that is a player device that is transmitting audio data from an audio collection to a speaker. The master device can determine that a second device of the dynamic set of devices is to take over as the player device. The master device can transmit, to the second device, a characteristic of the transmission of the audio data from the audio collection to the speaker.

Some embodiments relate to an electronic device that can include an input component configured to receive inputs from a user, an output component configured to transmit audio data, and one or more processors coupled to the input component and to the output component. The electronic device can also include a computer-readable storage medium containing instructions, that, when executed by the one or more processors, cause the one or more processors to perform a set of actions. The actions can include identifying an audio collection that includes one or more songs and determining that the electronic device is a player device. The actions can also include transmitting audio data from the audio collection to a speaker, accessing a rule that indicates whether another device is to take over as the player device, and determining that a second device is to take over as the player device based on a property of the second device and the accessed rule. The actions can further include transmitting, to the second device, a characteristic of the transmission of the audio data from the audio collection to the speaker and causing transmission of the audio data from the audio collection from the electronic device to the speaker to cease.

Some embodiments relate to a master electronic device that includes one or more processors coupled to the input component and to the output component and a computer-readable storage medium. The medium can contain instructions, that, when executed by the one or more processors, cause the one or more processors to perform a set of actions. The actions can include identifying a dynamic set of devices. Each of the dynamic set of devices can be within a same area and has the capability to transmit audio data to a speaker. The actions can also include identifying a first device of the dynamic set of devices that is a player device that is transmitting audio data from an audio collection to a speaker, and determining that a second device of the dynamic set of devices is to take over as the player device. The actions can further include transmitting, to the second device, a characteristic of the transmission of the audio data from the audio collection to the speaker.

The following detailed description together with the accompanying drawings will provide a better understanding of the nature and advantages of the present invention.

DETAILED DESCRIPTION

Figure 1:
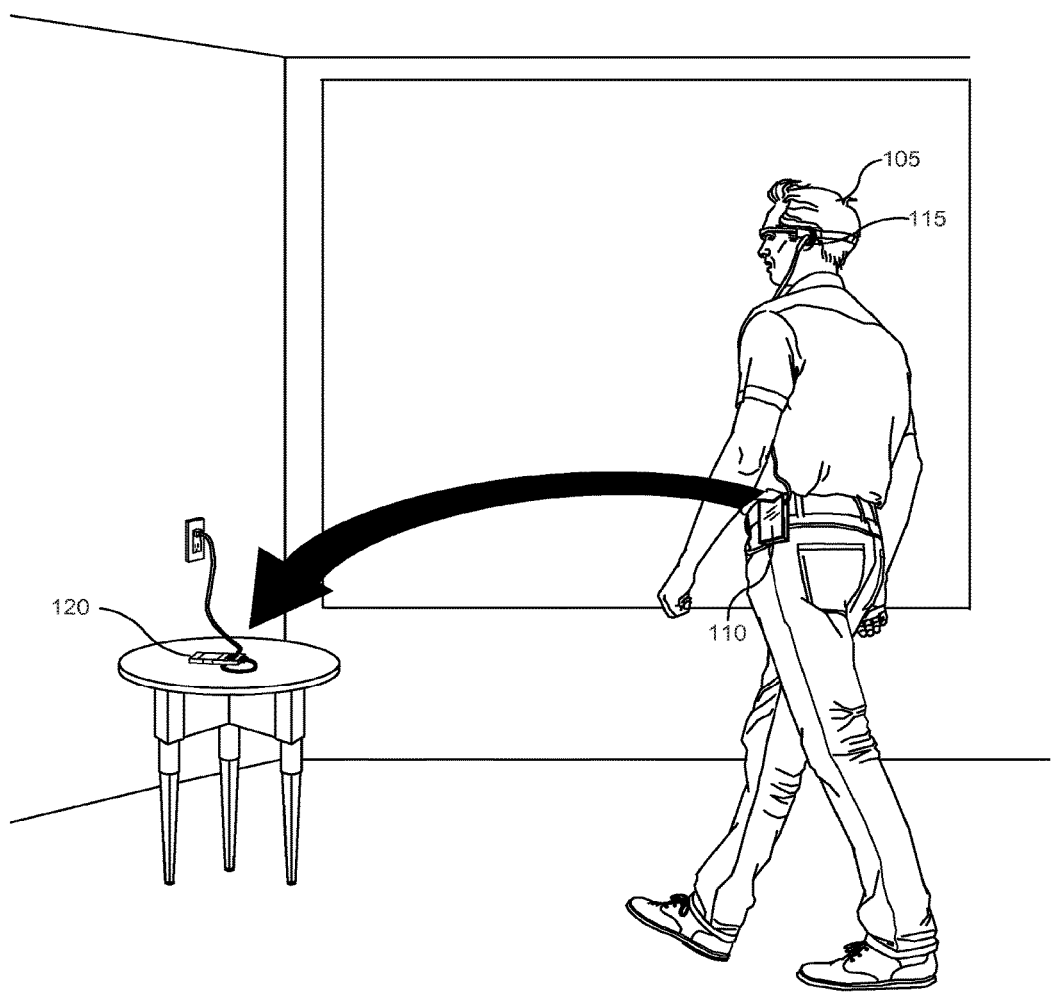
FIG. 1 shows an example of audio play being transferred between devices in response to a user movements.

Certain embodiments of the present invention can facilitate a smooth listening experience, during which a user can enjoy continuous music play despite moving between settings or using a device with restricted playing capabilities. A user can initiate play of an audio collection on a first device.

The first device (e.g., before or after starting to play the collection) can detect nearby devices (e.g., paired devices connected to the first device via a Bluetooth or BTLE connection). Using a rule, it can be determined whether the first device is to remain as the player device (at least temporarily) or whether a detected device is to take over the play, in which case play-transfer preparations can be made. A message can be sent to a second device that includes play information (e.g., an audio-collection identifier, play position, volume variable and/or speaker identifier) and a play start time. In some instances (e.g., when play transfer is coordinated by a master device independent from the first and second devices), a message is also sent to the first device indicating that it is to stop its play at a particular time. The second device can then begin playing music (e.g., using a same or different speaker as used by the first device) and the first device can stop playing music substantially simultaneously.

In some embodiments, while a first player device is playing songs from an audio collection, one or more second devices can be assessed for potentially taking over the play. This assessment can be made by comparatively evaluating properties of the other devices, such as their power source (e.g., favoring AC, reliable power sources), remaining battery charge (if applicable), network connection strength, access to a song, and/or device type. For example, in one instance, a device relying on a battery for power can initiate a play transfer to a second device with an AC power source (e.g., regardless of a battery charge remaining). When a determination is made to transfer the play to a second device, a message can be sent to the second player device that indicates when to begin play and which song to play. The first player device can cease playing substantially at the same time that the new player device begins play.

For example, a user can initiate play of an audio collection using an electronic wearable device, such as smart glasses, a smart earpiece, smart headphones, a smart watch, a smart armband and the like. The wearable device can then continuously transmit music data to a speaker, such as a Bluetooth speaker or headset. While the wearable device allows the music to follow the user as he moves, playing the audio collection can quickly drain the wearable device's battery, such that it can be unlikely that the user will be able to enjoy the music for an extended period. For example, the wearable device can therefore itself scout for other nearby devices equipped to take over play. The wearable device can detect a laptop with a stable AC power source that has other acceptable music-playing capabilities. The wearable device can then send a message to the laptop indicating that the laptop is to begin (immediately or at a later time) playing the audio collection The wearable device can stop playing music at the take-over time. The laptop can then take over the play and itself transmit music data to a same speaker (e.g., Bluetooth speaker or headset) as used by the wearable device or a different speaker. The wearable device, the laptop or another device can then monitor the play of the laptop and/or determine whether the laptop is to yield its play to another device (e.g., the wearable device or third device). In this manner, music-player devices can smoothly hand off music play to each other to benefit from their combined capabilities.

FIG. 1 shows a user 105 listening to music while walking into a room. User 105 is wearing a wearable device 110 on a body part (e.g., his head). Wearable device 110 can play music from an audio collection that, e.g., can be accessed over a network (e.g., streamed from a source or retrieved from a remote data store) or that is stored on the device. Specifically, wearable device 110 can transmit music to speakers 115, which user 105 can position in his ears.

Wearable device 110 can include a battery that is draining throughout the music play. Thus, a master device (which can be wearable device 110 or another device) can monitor to determine whether another device is nearby that can take over playing the music. In the depicted illustration, a mobile device 120 (e.g., a smart phone) can be detected as user 105 nears it. The master device can assess properties of mobile device 120, such as whether it has access to music (e.g., generally or that in the audio collection), its power state (e.g., remaining battery charge), its power source (e.g., AC source versus battery), and/or speaker connection strength. In this illustration, mobile device 120 has a stable power source, has access to the same audio collection (e.g., via a network connection), and has a satisfactory connection between mobile device 120 and the speakers 115.

Thus, in the depicted illustration, the master device can coordinate transfer of play from wearable device 110 to mobile device 120. A message can be sent to mobile device 120 that indicates that it is to begin playing songs. The message can further identify the audio collection and/or a play variable that indicates or constrains what music is to be played (e.g., a start position in an audio collection). In some instances (e.g., when the master device is not the first device), a message can also be sent to wearable device 110 indicating that it is to stop playing songs. Mobile device 120 can itself access, via the network, at least part of the same audio collection using the collection identification from the message. Mobile device 120 can then begin playing the audio collection. The data that is retrieved and/or what is initially played can be determined based on the play variable. For example, the play variable can indicate a song identifier or intra-song time, and play can begin appropriately. At substantially a same time, wearable device 110 can stop transmitting music to speakers 115.

Thus, music play can seamlessly transfer from wearable device 110 to mobile device 120. In this instance, music continues to be transmitted via a same set of speakers 115, though in other embodiments, speakers could change after the transfer (e.g., to select speakers closest to the player device). The transfer may even occur without any required intervention from the user and/or (in some instances) even any indication to the user that the transfer is occurring, has occurred or will occur.

Figure 2:
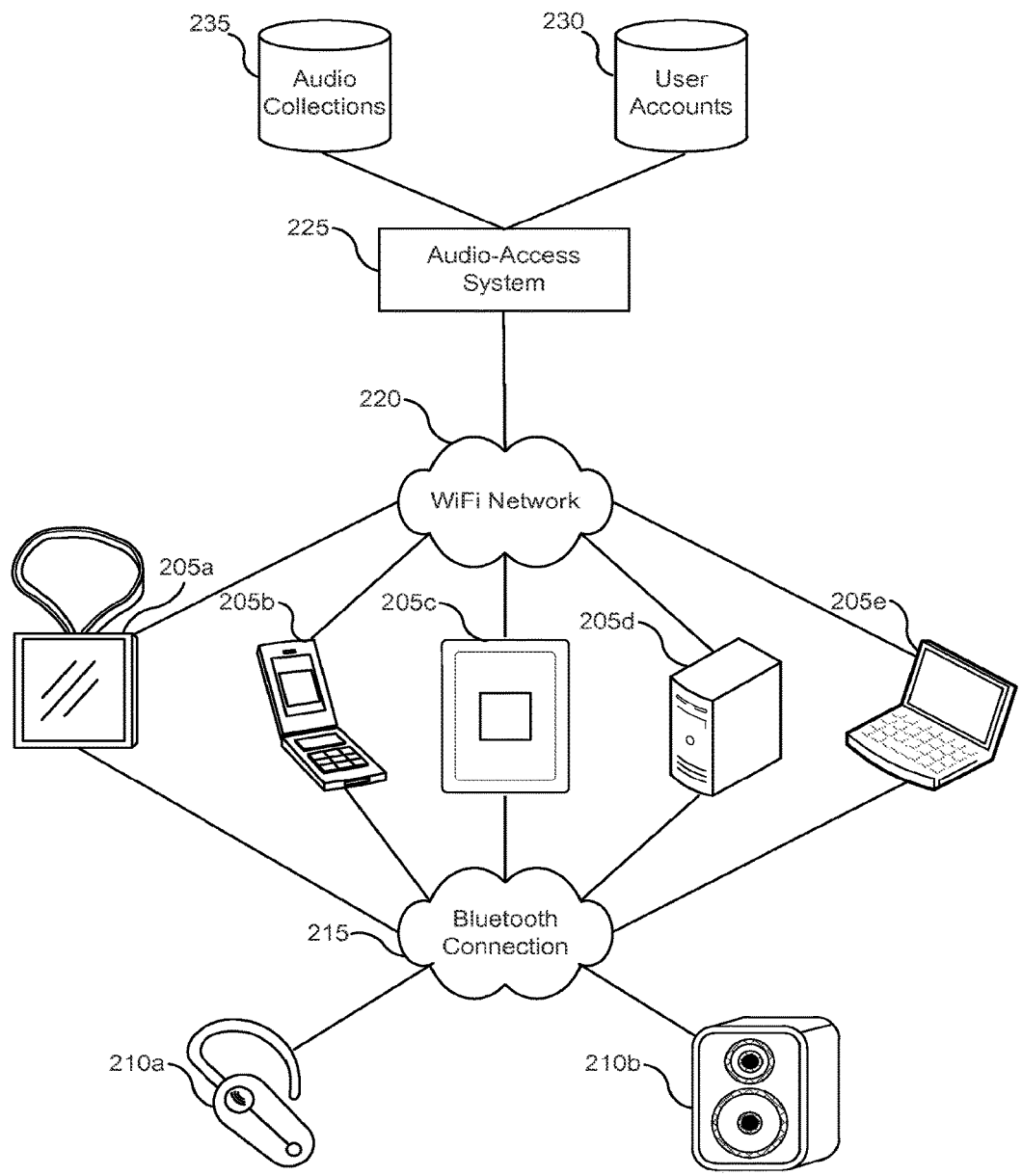
FIG. 2 shows examples of devices connected on a network with access to an audio collection.

FIG. 2 shows examples of devices connected on a network with access to an audio collection. Exemplary devices 205 that can play music include a wearable device 205a (e.g., such as smart glasses, a smart earpiece, smart headphones, a smart watch, a smart armband and the like), a phone 205b (e.g., a smart phone), a tablet 205c, a television 205d and a computer 205e.

Each device 205 can be configured to play music via a speaker. For example, a device 205 can include a speaker, a device 205 can include an output port of jack that can receive a cable that can be connected to a speaker, or a device 205 can wirelessly transmit audio to a speaker. In the depicted illustration, each device 205 is Bluetooth compatible and can communicate, via a Bluetooth connection 215 or BTLE connection, with Bluetooth-compatible speakers, such as earpiece speaker 210a or speaker 210b. A speaker for audio output can be selected. e.g., by selecting or favorably weighting a speaker with a strongest connection to a player device, a speaker with a strongest connection to a play-initiating device, a most-recently used speaker, a speaker highest amongst those in range in a hierarchy (e.g., defined by a user) or a user-selected speaker.

Each device 205 can have access to an audio collection. An audio collection can include a collection of audio data, such as a collection of music data (or spoken data, such as a podcast). The audio collection can include a single song or a group of songs. In various instances, the audio collections accessible to various devices 205 can be the same, different, or partly overlapping. The audio collection can include multiple songs and can include an organization. For example, one audio collection can include a sequenced playlist with the songs in the playlist. As another example, one audio collection can include a group of songs, each of which is categorized as a genre such as "Big band". In some instances, part or all of the audio collection is stored on a device and/or in the cloud. The could can be a remote storage accessible to a device via a network, such as the Internet. A user can, for example, store a song library in the cloud, and one or more devices can thus be able to access the library via a network. In some instances, part or all of the audio collection is provided by a third party. For example, the audio collection can include an audio stream and/or online radio. In some instances, part or all of the audio collection is streamed from a third-party system.

In the depicted illustration, each device can access a (same or different) audio collection (e.g., a user's collection stored in the cloud or a collection provided by a third party) via a WiFi network 220. An audio-access system 225 can (in some instances) verify that a device is authorized to receive a song of the audio collection. For example, a device 205 can request a song from an audio collection and include a user identifier with the request. This request can include, in some instances, an identifier of a specific collection, an identifier of a song, an identifier of a place in a song or collection and/or a song category (e.g., artist or genre). Audio-access system 225 can then look up the user identifier in a user accounts data store 230 to determine which collection(s) can be accessed by the user. If the user is authorized to receive the requested audio collection, audio-access system 225 can retrieve part or all of the audio collection from an audio collections data store 235 and return the collected data to the requesting the device. This type of communication can be performed one time, repeatedly or continuously (e.g., in streaming embodiments).

Either of Bluetooth connection 215 and WiFi network 220 can also support transfer of play between devices. Specifically, the connections can allow a given device to detect other nearby devices, identify properties of the detected devices, arrange for music play to be transferred to a device and/or communicate play-relevant inputs to a player device. Short-range connections, such as Bluetooth connection 215 or a BTLE connection can be particularly convenient for such communications, given the ability to conserve power.

The decision as to whether and/or which device is to take over audio play can be made by a master device. This master device can include the player device, another local device or a remote system. Which device is designated to be the master device can change in time (e.g., such that the player device is always the master device) or it can remain fixed (e.g., such that a wearable device 205a is always a master device or such that a device that initiated a music play is the master device until the play is terminated).

To coordinate a play transfer from a first device to a second device, a communication can be sent to a second player device (e.g., over Bluetooth connection 215) with explicit or implicit instructions to start play. The communication can further include details indicative of what music is to be played and when play is to begin. When appropriate (e.g., when the master device was not a pre-transfer player device), the master device can also send a communication to the first device to stop playing. The second device can then access appropriate music (e.g., by retrieving it from a local data store, receiving it from a remote data store, streaming it from a source or receiving it from the first device) and seamlessly continue the preceding music play.

Due to the devices' similar connections, play can be smoothly transferred across devices. In one instance, each device can have access to a same audio collection via audio-access system 225. Thus, a second device can continue playing the same songs as played by a first device subsequent to a play transfer. Further, in some embodiments, each of multiple devices can even be configured to play songs using a same speaker.

It will be appreciated that the illustration in FIG. 2 can be modified to include other types of connections and networks. For example, connection 215 can be modified to include a wired connection, and network 220 can include a local area network.

Figure 3:
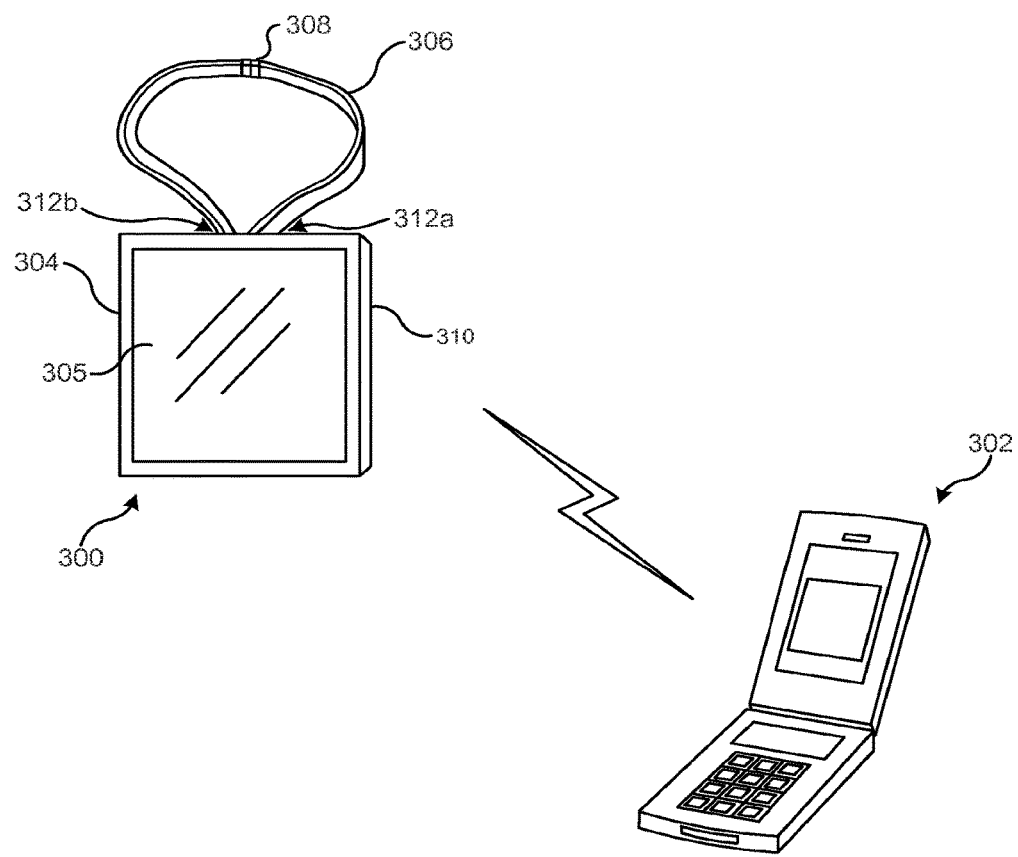
FIG. 3 shows a wearable device communicating wirelessly with a mobile device according to an embodiment of the present invention.

FIG. 3 shows a wearable device 300 communicating wirelessly with a mobile device 302 according to an embodiment of the present invention. While a simplistic wearable device and a smartphone are included in the illustration, it will be appreciated that the illustrated devices can represent any two electronic devices capable of playing audio files and communicating over a network. Examples of a communication include: a broadcast searching for nearby devices, requesting a property from a receiving device, identifying a property (e.g., of a transmitting device), indicating that a receiving device is to take over music play, accepting take-over responsibility, and/or identifying play information (e.g., an identifier of an audio collection). In this example, wearable device 300 is shown as a banded screen device with a face portion 304 connected to a strap 306, which can include a clasp 308 that facilitates connection and disconnection of distal ends of strap 306.

Face portion 304 can include, e.g., a touchscreen display 305 that can be appropriately sized depending on where on a user's person wearable device 300 is intended to be worn. A user can view information presented by wearable device 300 on touchscreen display 305 and provide input to wearable device 300 by touching touchscreen display 305. For example, a user can use touchscreen display 305 to select an audio collection, to initiate play of music in the audio collection and/or to control play characteristics (e.g., volume, pause, and/or song skip). In some embodiments, touchscreen display 305 can occupy most or all of the front surface of face portion 304.

Strap 306 (including any clasp that may be present) can include sensors that allow wearable device 300 to determine whether it is being worn at any given time. Wearable device 300 can operate differently depending on whether it is currently being worn or not. For example, wearable device 300 can inactivate various user interface and/or RF interface components when it is not being worn. In addition, in some embodiments, wearable device 300 can notify mobile device 302 when a user puts on or takes off wearable device 300. Further, strap 306 can include sensors capable of detecting body articulations of a user wearing device 300; examples of such sensors are described below.

Mobile device 302 can be any device that communicates with wearable device 300 and that a user might carry from place to place and use in different places. For example, mobile device 302 can be a handheld device that is designed to be held in a user's hand during use and stowed somewhere (e.g., in a pocket or bag) when not in use. In FIG. 3, mobile device 302 is shown as a smart phone; however, other devices can be substituted, such as a tablet computer, a media player, any type of mobile phone or other handheld computing and/or communication device, a laptop computer, or the like. In some embodiments, wearable device 300 can also communicate with other host devices that are not necessarily mobile, such as desktop computer systems, point-of-sale terminals, security systems, environmental control systems, and so on. Mobile device 302 (and any other host devices) can communicate wirelessly with wearable device 300, e.g., using protocols such as Bluetooth or Wi-Fi. In some embodiments, wearable device 300 can include an electrical connector 310 that can be used to provide a wired connection to mobile device 302 and/or to other devices, e.g., by using suitable cables. For example, connector 310 can be used to connect to a power supply to charge an onboard battery of wearable device 300.

In some embodiments, wearable device 300 and mobile device 302 can interoperate to enhance functionality available on one of the devices. For example, wearable device 300 and mobile device 302 can establish a pairing using a wireless communication technology such as Bluetooth. While the devices are paired, one of the devices can send notifications of selected events (e.g., receiving a phone call, text message, or email message) to the other device, such that it can present corresponding alerts to the user. As one example, mobile device 302 can send notifications of receiving a phone call, text message, or email message to wearable device 300. As another example, a player device (e.g., mobile device 302) can send notifications of song play (e.g., song title, artist and/or time into song) to one or more other devices (e.g., wearable device 300). As yet another example, a notification can be sent that play is about to be transferred from a first device to a second device.

Wearable device 300 can also provide an input interface via which a user can provide input. For example, the input can include a response to an alert (e.g., to answer a phone call, reply to a text message or rate a song). As another example, the input can include one to initiate an action (e.g., change a volume, skip over all or part of a song, fast-forward, rewind, pause, play, select a song, select a playlist, select a genre, turn on a display screen, place a phone call, or send a text message) or to constrain speaker selection (e.g., by selecting a speaker to use, by selecting a speaker not to use, by selecting a type of speaker to use or by selecting a type of speaker not to use). As yet another example, the input can include an indication that an identified play transfer is not to occur.

It will be appreciated that wearable device 300 and mobile device 302 are illustrative and that variations and modifications are possible. For example, wearable device 300 can be implemented in a variety of wearable articles, including an earpiece, headphones a bracelet, a belt, an arm band, watch, a bracelet, or the like. In some embodiments, wearable device 300 can be operative regardless of whether mobile device 302 is in communication with wearable device 300.

Figure 4:
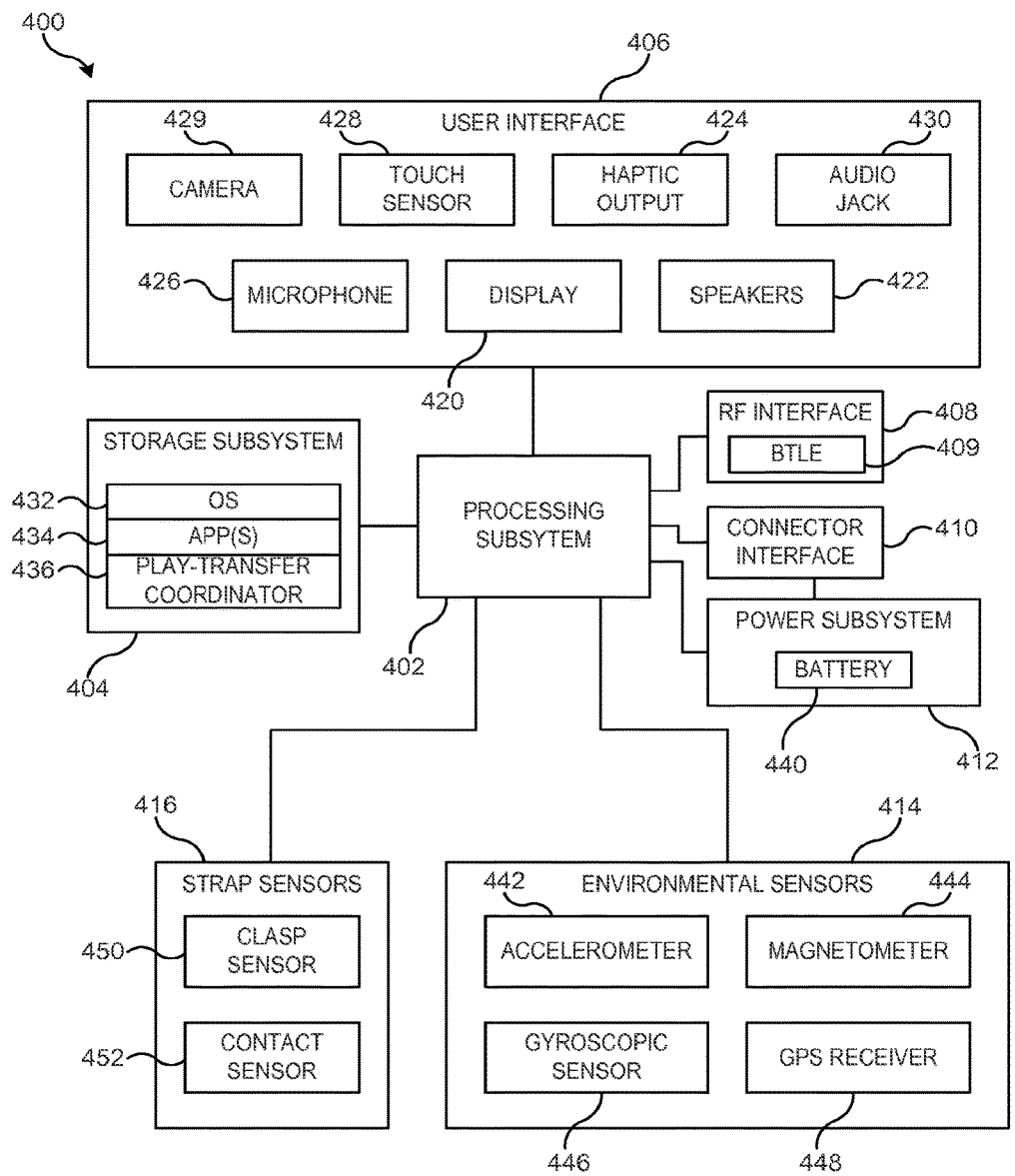
FIG. 4 is a simplified block diagram of a wearable device according to an embodiment of the present invention.

Wearable device 300 can be implemented using electronic components disposed within face portion 304 and/or strap 306. FIG. 4 is a simplified block diagram of a wearable device 400 (e.g., implementing wearable device 300) according to an embodiment of the present invention. Wearable device 400 can include processing subsystem 402, storage subsystem 404, user interface 406, RF interface 408, connector interface 410, power subsystem 412, environmental sensors 414, and strap sensors 416. Wearable device 400 can also include other components (not explicitly shown).

Storage subsystem 404 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 404 can store media items such as audio files, video files, image or artwork files; information about a user's contacts (names, addresses, phone numbers, etc.); playlists; information about a user's scheduled appointments and events; notes; and/or other types of information, examples of which are described below. In some embodiments, storage subsystem 404 can also store one or more application programs (or apps) 434 to be executed by processing subsystem 402 (e.g., video game programs, personal information management programs, media playback programs, interface programs associated with particular host devices and/or host device functionalities, etc.).

User interface 406 can include any combination of input and output devices. A user can operate input devices of user interface 406 to invoke the functionality of wearable device 400 and can view, hear, and/or otherwise experience output from wearable device 400 via output devices of user interface 406.

Examples of output devices include display 420, speakers 422, and haptic output generator 424. Display 420 can be implemented using compact display technologies, e.g., LCD (liquid crystal display). LED (light-emitting diode), OLED (organic light-emitting diode), or the like. In some embodiments, display 420 can incorporate a flexible display element or curved-glass display element, allowing wearable device 400 to conform to a desired shape. One or more speakers 422 can be provided using small-form-factor speaker technologies, including any technology capable of converting electronic signals into audible sound waves. In some embodiments, speakers 422 can be used to produce tones (e.g., beeping or ringing) and can but need not be capable of reproducing sounds such as speech or music with any particular degree of fidelity. Haptic output generator 424 can be, e.g., a device that converts electronic signals into vibrations; in some embodiments, the vibrations can be strong enough to be felt by a user wearing wearable device 400 but not so strong as to produce distinct sounds. As described in greater detail below, wearable device 300 can further function to play songs by transmitting audio data to a separate speaker.

Examples of input devices include microphone 426, touch sensor 428, and camera 429. Microphone 426 can include any device that converts sound waves into electronic signals. In some embodiments, microphone 426 can be sufficiently sensitive to provide a representation of specific words spoken by a user; in other embodiments, microphone 426 can be usable to provide indications of general ambient sound levels without necessarily providing a high-quality electronic representation of specific sounds.

Touch sensor 428 can include, e.g., a capacitive sensor array with the ability to localize contacts to a particular point or region on the surface of the sensor and in some instances, the ability to distinguish multiple simultaneous contacts. In some embodiments, touch sensor 428 can be overlaid over display 420 to provide a touchscreen interface (e.g., touchscreen interface 103 of FIG. 3), and processing subsystem 404 can translate touch events (including taps and/or other gestures made with one or more contacts) into specific user inputs depending on what is currently displayed on display 420.

Camera 429 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 404 and/or transmitted by wearable device 400 to other devices for storage. Depending on implementation, the optical components can provide fixed focal distance or variable focal distance; in the latter case, autofocus can be provided. In some embodiments, camera 429 can be disposed along an edge of face member 304 of FIG. 3, e.g., the top edge, and oriented to allow a user to capture images of nearby objects in the environment such as a bar code or QR code. In other embodiments, camera 429 can be disposed on the front surface of face member 304, e.g., to capture images of the user. Zero, one, or more cameras can be provided, depending on implementation.

In some embodiments, user interface 406 can provide output to and/or receive input from an auxiliary device such as a headset. For example, audio jack 430 can connect via an audio cable (e.g., a standard 2.5-mm or 3.5-mm audio cable) to an auxiliary device. Audio jack 430 can include input and/or output paths. Accordingly, audio jack 430 can provide audio to the auxiliary device and/or receive audio from the auxiliary device. In some embodiments, a wireless connection interface can be used to communicate with an auxiliary device.

Processing subsystem 402 can be implemented as one or more integrated circuits, e.g., one or more single-core or multi-core microprocessors or microcontrollers, examples of which are known in the art. In operation, processing system 402 can control the operation of wearable device 400. In various embodiments, processing subsystem 404 can execute a variety of programs in response to program code and can maintain multiple concurrently executing programs or processes. At any given time, some or all of the program code to be executed can be resident in processing subsystem 404 and/or in storage media such as storage subsystem 404.

Through suitable programming, processing subsystem 402 can provide various functionality for wearable device 400. For example, in some embodiments, processing subsystem 402 can execute an operating system (OS) 432 and various applications 434 such as a phone-interface application, a text-message-interface application, a media interface application, a fitness application, and/or other applications. In some embodiments, some or all of these application programs can interact with a host device, e.g., by generating messages to be sent to the host device and/or by receiving and interpreting messages from the host device. In some embodiments, some or all of the application programs can operate locally to wearable device 400. For example, if wearable device 400 has a local media library stored in storage subsystem 404, a media interface application can provide a user interface to select and play locally stored media items.

Processing subsystem 402 can also execute play-transfer coordination code 436 (which can be part of OS 432 or separate as desired). In some embodiments, execution of play-transfer coordination code 436 can cause wearable device 400 to scout (e.g., while playing music from an audio collection) to determine whether there is a nearby device (e.g., mobile device 302) and to evaluate characteristics of the device using a rule to determine whether the device should be made a player device. If so, execution of play-transfer coordination code 436 can send a communication to the identified device preparing it to take over an audio play (e.g., identifying what content is to be played, when play is to begin and a volume parameter). Execution of code 436 can cause wearable device 400 to stop playing music at a time that the device is to being play. In some embodiments, execution of play-transfer coordination code 436 stops subsequent to the play transfer.

In other embodiments, continued execution monitors play at the player device. For example, properties (e.g., location, battery charge, power source, and/or network-connection strength) of the player device can be received from the device and can be evaluated in isolation or relative to other devices (e.g., wearable device 400 and/or other nearby devices) using a take-over rule. As another example, execution can monitor play progress (e.g., a song being played, a position in the song or a radio station). In one instance, this information can be sent from a player device, e.g., at routine intervals, when play of a new song begins, or after effecting play-pertaining user input (e.g., to select a new song).

RF (radio frequency) interface 408 can allow wearable device 400 to communicate wirelessly with various host devices. RF interface 408 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. In some embodiments, RF interface 408 can implement a Bluetooth LE (Low energy) proximity sensor 409 that supports proximity detection through an estimation of signal strength and/or other protocols for determining proximity to another electronic device. In some embodiments, RF interface 408 can provide near-field communication ("NFC") capability, e.g., implementing the ISO/IEC 18092 standards or the like; NFC can support wireless data exchange between devices over a very short range (e.g., 20 centimeters or less). RF interface 408 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 408.

Connector interface 210 can allow wearable device 200 to communicate with various host devices via a wired communication path, e.g., using Universal Serial Bus (USB), universal asynchronous receiver/transmitter (UART), or other protocols for wired data communication. In some embodiments, connector interface 210 can provide a power port, allowing wearable device 200 to receive power, e.g., to charge an internal battery 240. For example, connector interface 210 can include a connector such as a mini USB connector or a custom connector, as well as supporting circuitry.

In some embodiments, connector interface 410 and/or RF interface 408 can be used to support synchronization operations in which data is transferred from a host device to wearable device 400 (or vice versa). For example, a user can be able to customize settings and other information for wearable device 400. While user interface 406 can support data-entry operations, a user can find it more convenient to define customized information on a separate device (e.g., a tablet or smartphone) that has a larger interface (e.g., including a real or virtual alphanumeric keyboard), then transfer the customized information to wearable device 400 via a synchronization operation. Synchronization operations can also be used to load and/or update other types of data in storage subsystem 404, such as media items, application programs, personal data, and/or operating system programs. Synchronization operations can be performed in response to an explicit user request and/or automatically, e.g., when wireless device 400 resumes communication with a particular host device or in response to either device receiving an update to its copy of synchronized information.

Environmental sensors 414 can include various electronic, mechanical, electromechanical, optical, or other devices that provide information related to external conditions around wearable device 400. Sensors 414 in some embodiments can provide digital signals to processing subsystem 402, e.g., on a streaming basis or in response to polling by processing subsystem 402 as desired. Any type and combination of environmental sensors can be used; shown by way of example are accelerometer 442, a magnetometer 444, a gyroscope 446, and a GPS receiver 448.

Some environmental sensors can provide information about the location and/or motion of wearable device 400. For example, accelerometer 442 can sense acceleration (relative to freefall) along one or more axes, e.g., using piezoelectric or other components in conjunction with associated electronics to produce a signal. Magnetometer 444 can sense an ambient magnetic field (e.g., Earth's magnetic field) and generate a corresponding electrical signal, which can be interpreted as a compass direction. Gyroscopic sensor 446 can sense rotational motion in one or more directions, e.g., using one or more MEMS (micro-electro-mechanical systems) gyroscopes and related control and sensing circuitry. Global Positioning System (GPS) receiver 448 can determine location based on signals received from GPS satellites.

Other sensors can also be included in addition to or instead of these examples. For example, a sound sensor can incorporate microphone 426 together with associated circuitry and/or program code to determine, e.g., a decibel level of ambient sound. Temperature sensors, proximity sensors, ambient light sensors, or the like can also be included.

Strap sensors 416 can include various electronic, mechanical, electromechanical, optical, or other devices that provide information as to whether wearable device 400 is currently being worn. In some embodiments, certain features of wearable device 400 can be selectively enabled or disabled depending on whether wearable device 400 is currently being worn Power subsystem 412 can provide power and power management capabilities for wearable device 400. For example, power subsystem 412 can include a battery 440 (e.g., a rechargeable battery) and associated circuitry to distribute power from battery 440 to other components of wearable device 400 that require electrical power. In some embodiments, power subsystem 412 can also include circuitry operable to charge battery 440, e.g., when connector interface 410 is connected to a power source. In some embodiments, power subsystem 412 can include a "wireless" charger, such as an inductive charger, to charge battery 440 without relying on connector interface 410. In some embodiments, power subsystem 412 can also include other power sources, such as a solar cell, in addition to or instead of battery 440.

In some embodiments, power subsystem 412 can control power distribution to components within wearable device 400 to manage power consumption efficiently. For example, power subsystem 412 can automatically place device 400 into a "hibernation" state when strap sensors 416 or other sensors indicate that device 400 is not being worn. The hibernation state can be designed to reduce power consumption; accordingly, user interface 406 (or components thereof), RF interface 408, connector interface 410, and/or environmental sensors 414 can be powered down (e.g., to a low-power state or turned off entirely), while strap sensors 416 are powered up (either continuously or at intervals) to detect when a user puts on wearable device 400. As another example, in some embodiments, while wearable device 400 is being worn, power subsystem 412 can turn display 420 and/or other components on or off depending on motion and/or orientation of wearable device 400 detected by environmental sensors 414.

Power subsystem 412 can also provide other power management capabilities, such as regulating power consumption of other components of wearable device 400 based on the source and amount of available power, monitoring stored power in battery 440, generating user alerts if the stored power drops below a minimum level, and so on.

In some embodiments, control functions of power subsystem 412 can be implemented using programmable or controllable circuits operating in response to control signals generated by processing subsystem 402 in response to program code executing thereon, or as a separate microprocessor or microcontroller.

It will be appreciated that wearable device 400 is illustrative and that variations and modifications are possible. For example, strap sensors 416 can be modified, and wearable device 400 can include a user-operable control (e.g., a button or switch) that the user can operate to provide input. Controls can also be provided, e.g., to turn on or off display 420, mute or unmute sounds from speakers 422, etc. Wearable device 400 can include any types and combination of sensors and in some instances can include multiple sensors of a given type.

In various embodiments, a user interface can include any combination of any or all of the components described above, as well as other components not expressly described. For example, in some embodiments, the user interface can include, e.g., just a touchscreen, or a touchscreen and a speaker, or a touchscreen and a haptic device. Where the wearable device has an RF interface, a connector interface can be omitted, and all communication between the wearable device and other devices can be conducted using wireless communication protocols. A wired power connection, e.g., for charging a battery of the wearable device, can be provided separately from any data connection.

Further, while the wearable device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 4 be implemented in a given embodiment of a wearable device.

Figure 5:
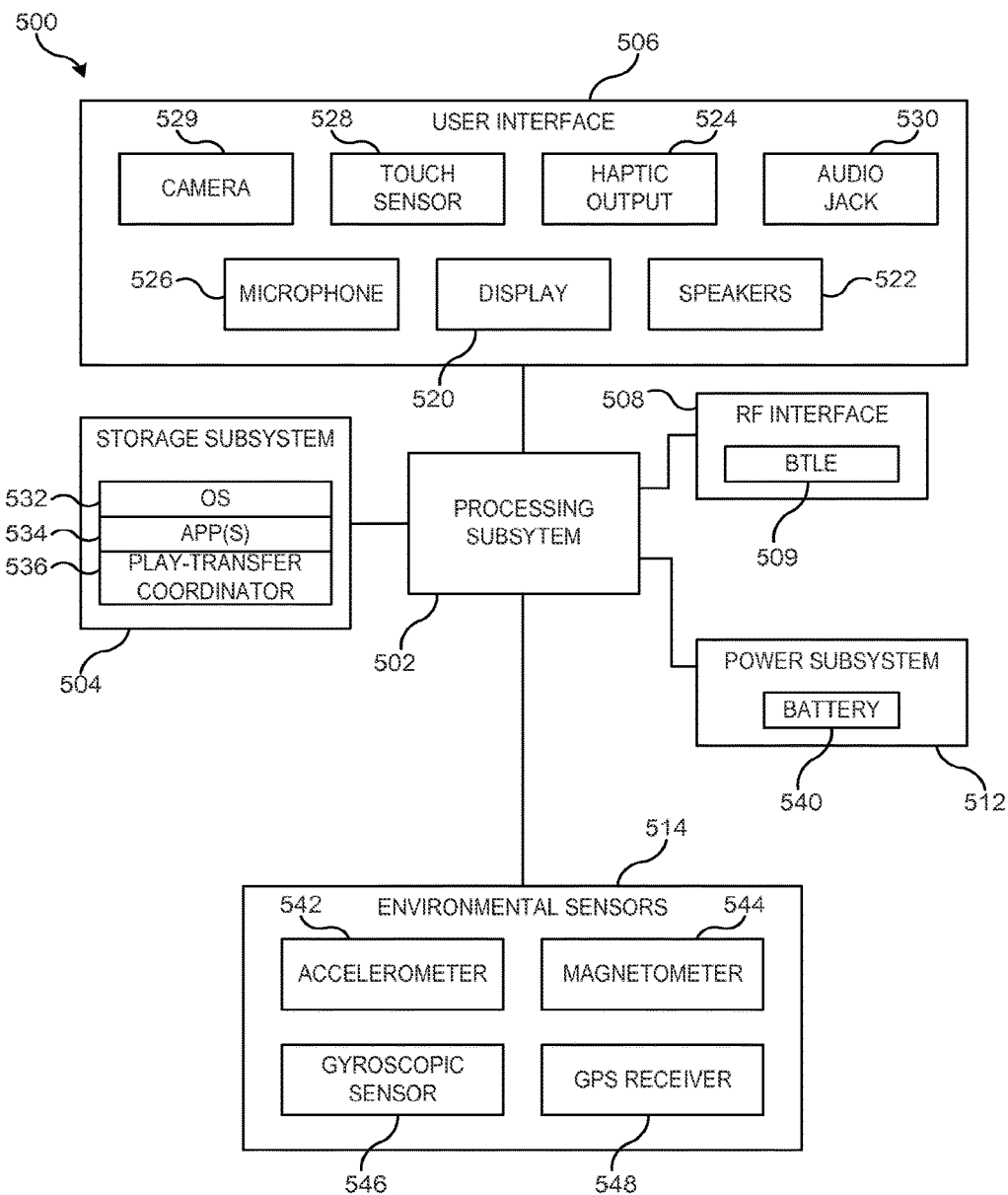
FIG. 5 is a simplified block diagram of a mobile device according to an embodiment of the present invention.

A mobile device such as mobile device 302 of FIG. 3 can be implemented as an electronic device using blocks similar to those described above (e.g., processors, storage media, user interface devices, data communication interfaces, etc.) and/or other blocks or components. FIG. 5 is a simplified block diagram of a mobile device 500 (e.g., implementing mobile device 302 of FIG. 3) according to an embodiment of the present invention. Mobile device 500 can include processing subsystem 502, storage subsystem 504, user interface 506, RF interface 508, power subsystem 512, and environmental sensors 514. Mobile device 500 can also include other components (not explicitly shown). Many of the components of mobile device 500 can be similar or identical to those of wearable device 400 of FIG. 4.

For instance, storage subsystem 504 can be generally similar to storage subsystem 204 and can include, e.g., using magnetic storage media, flash memory, other semiconductor memory (e.g., DRAM, SRAM), or any other non-transitory storage medium, or a combination of media, and can include volatile and/or non-volatile media. Like storage subsystem 404, storage subsystem 504 can be used to store data and/or program code to be executed by processing subsystem 502.

User interface 506 can include any combination of input and output devices. A user can operate input devices of user interface 506 to invoke the functionality of mobile device 500 and can view, hear, and/or otherwise experience output from mobile device 500 via output devices of user interface 506. Examples of output devices include display 520, speakers 522, and haptic output generator 524. Examples of input devices include microphone 526, touch sensor 528, and camera 529. These input and output devices can be similar to output devices described above with reference to FIG. 4.

Processing subsystem 502 can be implemented as one or more integrated circuits, e.g., one or more single-core or multi-core microprocessors or microcontrollers, examples of which are known in the art. In operation, processing system 502 can control the operation of mobile device 500. In various embodiments, processing subsystem 502 can execute a variety of programs in response to program code and can maintain multiple concurrently executing programs or processes. At any given time, some or all of the program code to be executed can be resident in processing subsystem 502 and/or in storage media such as storage subsystem 504.

Through suitable programming, processing subsystem 502 can provide various functionality for mobile device 500. For example, in some embodiments, processing subsystem 502 can execute an operating system (OS) 532 and various applications 534 such as a phone-interface application, a text-message-interface application, a media interface application, a fitness application, and/or other applications. In some embodiments, some or all of these application programs can interact with a wearable device, e.g., by generating messages to be sent to the wearable device and/or by receiving and interpreting messages from the wearable device. In some embodiments, some or all of the application programs can operate locally to mobile device 500.

Processing subsystem 502 can also execute play-transfer coordination code 536 (which can be part of OS 532 or separate as desired). In some embodiments, execution of play-transfer coordination code 536 can cause mobile device 500 to receive a broadcast scouting communication from a master device (e.g., wearable device 300 of FIG. 3), determine current properties of mobile device 500 (e.g., power source, battery charge (if applicable), WiFi network connection strength, whether a particular song or audio collection can be accessed, whether the particular song or audio collection is available in local storage, device type, and/or strength of a connection to a speaker), and respond to the broadcast communication with some or all of the determined properties. Execution of play-transfer coordination code 536 can further cause mobile device 500 to receive a transfer-preparation communication (e.g., that includes an identification of what to play and when to begin playing) from a master device (e.g., wearable device 300 of FIG. 3), to access the appropriate music and to begin playing the music at the appropriate time. In some instances, execution of play-transfer coordination code 536 can further cause mobile device 500 to then monitor its play, and/or to begin scouting for other devices to potentially take over play.

RF (radio frequency) interface 508 can allow mobile device 500 to communicate wirelessly with various other devices and networks. RF interface 508 can include RF transceiver components such as an antenna and supporting circuitry to enable data communication over a wireless medium, e.g., using cellular voice and/or data networks, Wi-Fi (IEEE 802.11 family standards), Bluetooth® (a family of standards promulgated by Bluetooth SIG, Inc.), or other protocols for wireless data communication. In some embodiments, RF interface 508 can implement a Bluetooth LE (Low energy) proximity sensor 509 that supports proximity detection through an estimation of signal strength and/or other protocols for determining proximity to another electronic device. In some embodiments, RF interface 508 can provide near-field communication ("NFC") capability. e.g., implementing the ISO/IEC 18092 standards or the like; NFC can support wireless data exchange between devices over a very short range (e.g., 20 centimeters or less). RF interface 508 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 508.

Environmental sensors 514 can include various electronic, mechanical, electromechanical, optical, or other devices that provide information related to external conditions around mobile device 500. Sensors 514 in some embodiments can provide digital signals to processing subsystem 502, e.g., on a streaming basis or in response to polling by processing subsystem 502 as desired. Any type and combination of environmental sensors can be used; shown by way of example are accelerometer 542, a magnetometer 544, a gyroscope 546, and a GPS receiver 548. These sensors can operate similarly to corresponding sensors in wearable device 400 described above. Other sensors can also be included in addition to or instead of these examples, such as temperature sensors, proximity sensors, ambient light sensors, ambient sound (or noise) sensors, or the like.

Power subsystem 512 can provide power and power management capabilities for mobile device 500. For example, power subsystem 512 can include a battery 540 (e.g., a rechargeable battery) and associated circuitry to distribute power from battery 540 to other components of mobile device 500 that require electrical power. In some embodiments, power subsystem 512 can also include circuitry operable to charge battery 540. e.g., when an electrical connector (not shown) is connected to a power source. In some embodiments, power subsystem 512 can include a "wireless" charger, such as an inductive charger, to charge battery 540 without relying on a physical connector. In some embodiments, power subsystem 512 can also include other power sources, such as a solar cell, in addition to or instead of battery 540.

In some embodiments, power subsystem 512 can control power distribution to components within mobile device 500 to manage power consumption efficiently. For example, when mobile device 500 is in an inactive state (not interacting with a user), power subsystem 512 can place device 500 into a low-power state, e.g., by powering off various components of user interface 506, RF interface 508, and/or environmental sensors 514. Power subsystem 512 can also provide other power management capabilities, such as regulating power consumption of other components of mobile device 500 based on the source and amount of available power, monitoring stored power in battery 540, generating user alerts if the stored power drops below a minimum level, and so on.

In some embodiments, control functions of power subsystem 512 can be implemented using programmable or controllable circuits operating in response to control signals generated by processing subsystem 502 in response to program code executing thereon, or as a separate microprocessor or microcontroller.

It will be appreciated that mobile device 500 is illustrative and that variations and modifications are possible. In various embodiments, other controls or components can be provided in addition to or instead of those described above. Any device capable of interacting with another device to coordinate playing as described herein can be a mobile device.

Further, while the mobile device is described with reference to particular blocks, it is to be understood that these blocks are defined for convenience of description and are not intended to imply a particular physical arrangement of component parts. Further, the blocks need not correspond to physically distinct components. Blocks can be configured to perform various operations. e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 5 be implemented in a given embodiment of a mobile device.

While FIGS. 3-5 illustrate characteristics of a wearable device and a mobile device, it will be appreciated that a device need not be mobile and can nevertheless share a characteristic as described with respect to a wearable device or mobile device. For example, a desktop computer can include components shown in FIG. 3, FIG. 4 and/or FIG. 5. Further, disclosure herein can make reference to any of a first device, second device, master device, interface device or player device. Any of these such devices can include a characteristic described with respect to a wearable device of mobile device, even if it is not itself wearable or mobile.

Communication between a mobile device and a wearable device can be implemented according to any communication protocol (or combination of protocols) that both devices are programmed or otherwise configured to use. In some instances, standard protocols such as Bluetooth protocols can be used. In some instances, a custom message format and syntax (including, e.g., a set of rules for interpreting particular bytes or sequences of bytes in a digital data transmission) can be defined, and messages can be transmitted using standard serial protocols such as a virtual serial port defined in certain Bluetooth standards. Embodiments of the invention are not limited to particular protocols, and those skilled in the art with access to the present teachings will recognize that numerous protocols can be used.

In accordance with certain embodiments of the present invention, devices (e.g., wearable device 300 and mobile device 302) can communicate such that play of an audio collection is smoothly transferred between the devices to take advantage of respective capabilities available at each device.

Figure 6:
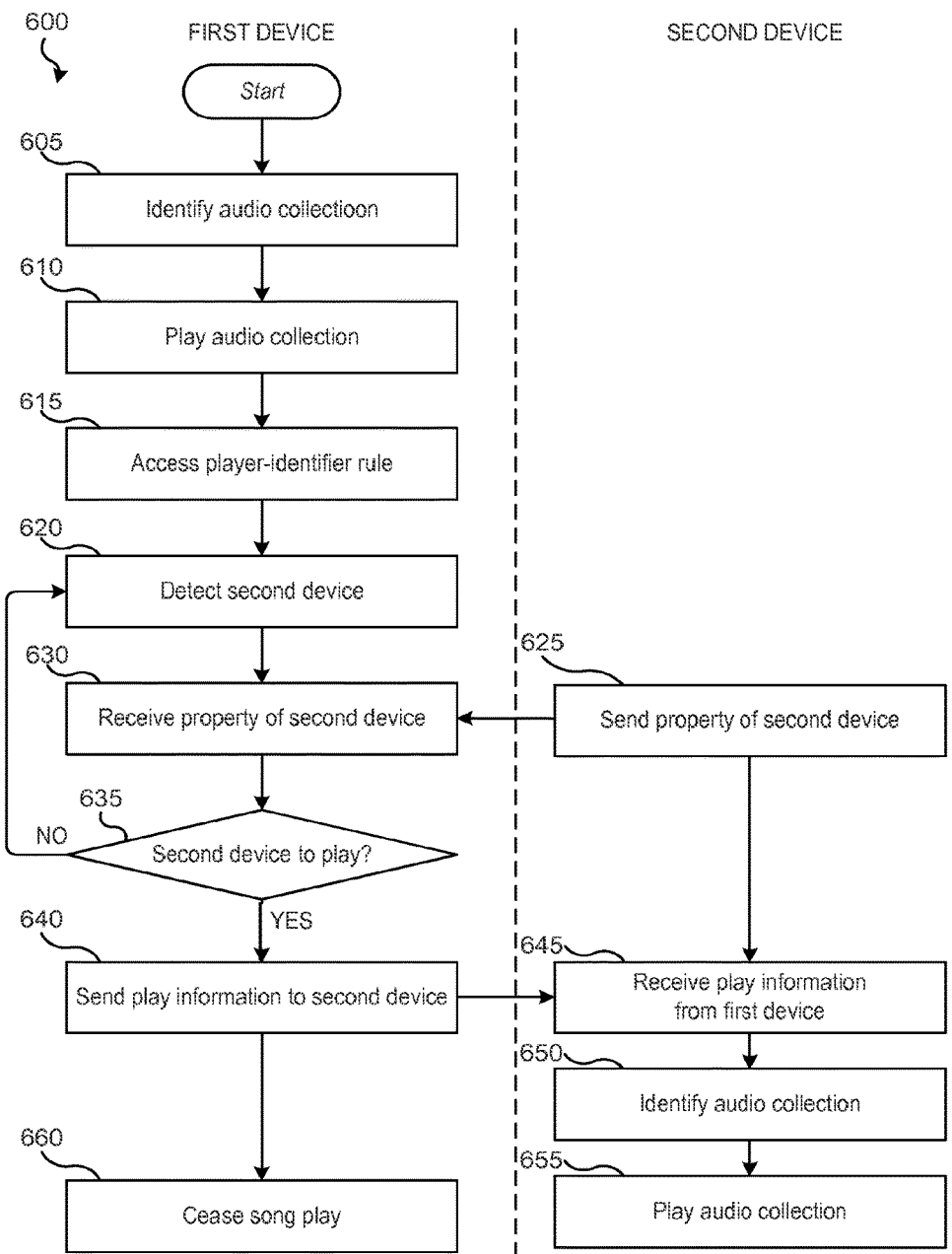
FIG. 6 is a flow diagram of a process for transferring audio play between devices according to an embodiment of the present invention.

FIG. 6 is a flow diagram of a process 600 for transferring audio play between devices according to an embodiment of the present invention. Portions of process 600 can be implemented in a first electronic device, while other portions can be implemented in a second electronic device. As one example, the first device can include wearable device 300, and the second device can include mobile device 302. It will, however, be appreciated that part of the advantage of the dynamic transfer is that any device can (e.g., depending on its current condition and/or a rule) be either the first or second device. Further, a single device can, in lime, be each of the first and the second device. For example, mobile device 302 can first take over play from wearable device 300 and can later transfer play to another device.

In some instances, process 600 can begin after a set of devices has been paired together and a user has requested (via an interface of a device) that music be played. For example, the user may have opened an app, selected a song, selected a playlist, or selected a play option. This request can be received at a first device. At block 605, the first device identifies an audio collection. The audio collection can include, for example, a playlist, a song, a portion of the song, an online radio station or a podcast. The collection can be identified based on a selection from a user (e.g., a selected playlist), a selection from a remote system (e.g., operating an online radio station) and/or a previous play station (e.g., such that play is resumed where play previously stopped). The identification can be performed by searching a local or remote data store and/or by receiving a communication from a remote system.

At block 610, the first device begins playing the audio collection. The audio collection can be played through a speaker on the first device, through an audio jack receiving an audio cable connected to a speaker or via wireless transmission to a speaker. The first device can select a speaker based on, e.g., a stored hierarchy or default, available speakers, and/or user preference. Playing the audio collection can include retrieving and/or receiving (e.g., once, periodically or continuously) music in the collection (e.g., from a local data store, a remote data store or a communication from a third-party system).

At block 615, a player-identifier rule is accessed. This rule can indicate how to select from amongst devices to identify a player device. The rule can include, e.g., a formula, a hierarchy, each of which can receive properties of a device to determine whether the device is to be made a player device. For example, a rule can include a scoring formula that includes weights for each of: whether device is plugged in, a device's WiFi connection strength, and a distance between the device and the first device. The rule can indicate that the formula is to be applied to each detected device (e.g., including the first device and each of one or more second devices) and that the device with the highest score is to be a player device. As another example, a rule can include a hierarchy indicating that computers are to be player devices over mobile phones and mobile phones are to be player devices over wearable devices. As another example, a rule can include a flowchart that first requires a device to have access to the audio collection and then characterizes the device as a player device if its battery size (or remaining battery capacity) exceeds that of the first device. In some instances, a rule includes a consistency factor that biases towards a same device playing music.

The rule can be fixed or customizable by a user. For example, a user can identify a device hierarchy and can identify particular devices which are never (or always) to take over as a player device. In some instances, a same rule can be shared across devices such that player-device designations are consistently assigned.

At block 620, the first device can detect whether a second device is in a nearby vicinity. In one instance, this detection effort can involve detecting a paired device that the first device can communicate with via a short-range communication (e.g., Bluetooth or BTLE). In one instance, this detection effort can involve detecting a paired device that is within a specified distance from the first device. This detection can be enabled, e.g., by tracking a location can of each device within a pairing network using the devices' GPS receivers and a WiFi network, or by using BTLE proximity-detection protocols.

At block 625, the second device can send one or more properties to the first device, and the first device can receive the properties at block 630. The properties can be pushed or pulled from the second device. For example, a first device can pull properties (e.g., via a broadcast message requesting information from the second device) at routine intervals or upon detecting a degradation in a property of the first device. In some instances, the properties are pulled in response to receiving an initial input requesting music play or after beginning play of the audio collection at block 610. The properties can include an indication as to the second device's location, power source, battery charge, network connection strength, total processing power, current CPU usage and/or speaker inclusion. The properties can include information about song access, such as which songs, playlists or other audio collections are locally stored on the second device or which audio-collection remote data stores the second device has access to.

At block 635, a determination is made as to whether the second device is to be designated as the player device. This determination can be made by assessing the received properties using the rule. The assessment can involve a comparative assessment (e.g., comparing multiple second devices and/or comparing a second device to the first player device). For example, the assessment can involve identifying a device with a highest score that is based on the properties. It will thus be appreciated that, in order to perform this comparison, corresponding properties of the first device and/or one or more other second devices can also be collected and analyzed.

When the second device is not to be designated as the player device, process 600 returns to block 620, where another second device can be analyzed or changed properties (e.g., of the same second device or of the first device or of the other devices in a comparative analysis) can be considered. When the second device is to be designated as the player device, process 600 continues to blocks 640 and 645 where the first device can send play information to the second device and the second device can receive the play information. The play information can include information that enables the second device to seamlessly take over play. For example, the play information can include an identifier of a song and a play position within a song (e.g., if play is to be transferred during the song's play) or an identifier of a playlist and of a play position within a playlist (e.g., if play is to be transferred between songs or during a song). The second device can then access the song or playlist and continue its play. As another example, the play information can include an identifier of an online radio station and/or a user identifier, such that the second device can begin streaming the appropriate music. As another example, the play information can include a characteristic of music, such as a genre or artist, such that the second device can search for a characteristic-matching song to continue the play. The play information can further include a time that the second device is to take over play. In some instances, however, a default assumption of such timing (e.g., immediate takeover) can be used. The play information can further include sound setting, such as a volume.

At block 650, the second device can use the properties to identify the audio collection. It will be appreciated that this identification can include identifying a song that corresponds to a song played at the first device. In one instance, the songs are the same, and the audio collection identified at block 650 corresponds to a later portion of the song relative to that already played. In one instance, the songs are on a same playlist or of a same genre. In one instance, the songs are from a same online music station, such that the identification at block 650 includes identifying the station. Thus, the collection identification at block 650 can include an identification that enables the second device to determine what music to begin playing such that the music play being transferred from the first device is substantially consistent, given (for example) an applicable or selected playlist, style preference, song selection, or station selection.

Upon identifying the audio collection, the second device takes over play of the music at block 655 at substantially the same time that the first device stops playing the music. In some instances, a small transition window can be present, during which both devices are playing music (e.g., the same music) simultaneously, and a volume of the first device's play can fade out as a volume of the second device's play fades in. The play can begin at a position within the collection as identified in the play information received at block 645. For example, the play information can include an indication to begin playing song #4 (from playlist #5) at time 1:32 into the song at 3:20 pm. The song can be played accordingly.

The play at block 655 can also match the play at block 610 in non-content characteristics. For example, the play information can be indicative of a volume, balance or filter to apply. The second device can then adjust any settings or filtering in order to provide a consistent sound throughout the play transfer.

The second device can play music using its local speakers, an audio jack or a wireless connection. The second device can play music using the same speakers as used by the first device or it can independently select speakers to use (e.g., using a stored hierarchy or default, available speakers, and/or user preference). Playing the audio collection can include retrieving and/or receiving (e.g., once, periodically or continuously) music in the collection (e.g., from a local data store, a remote data store or a communication from a third-party system).

While process 600 illustrates a situation in which a first device assesses a single second device for take-over, it will be appreciated that the process could be modified to detect multiple second devices, receive properties from each second device and then comparatively evaluate all of the second devices.

Process 600 can also be modified such that the second device makes the determination as to whether play is to be transferred. For example, a first device can use a technique for computing a playing score that depends on its properties (e.g., remaining charge time and/or network connection strength). The first device can then broadcast the score. Each second device that receives the broadcast can itself similarly compute a playing score based on its own properties. If a given second device determines that its score exceeds that from the first device, it can respond to the first device (e.g., with its score). In one instance, the first device can then compare all received scores and send play information to the second device with the highest score. In one instance, the first device sends play information to the first responding second device.

In one instance, block 605 occurs in response to receiving input at the first device corresponding to a request to play music. Process 600 then indicates that the same device that received the input initially plays at least some music. In some instances, the first device immediately assesses other nearby devices to identify a player device and need not, itself, play any music.

Process 600 allows for music to be smoothly transferred between devices. Thus, music play can be seamlessly transferred to devices with desired connectivity and/or power states, music-access states, and/or speaker connections without interrupting the user's enjoyment of the music. Though not shown, it will be appreciated that process can be extended such that the second device performs equivalents of blocks 615, 630, 635, 640 and 660 and a third device performs equivalents of blocks 625, 645, 650 and 655. That is, whichever device is a player device can serve as a master device to reassess whether play should be transferred to another device.

A dynamic master-device designation offers advantages. For example, when a master device is defined as being the player device, it can quickly detect potential performance degradations and begin searching for a new device to take over play. However, such definition has several other potential disadvantages. While individual device takeovers can be constrained based on effective distance constraints (e.g., Bluetooth connections), as the master device is passed from device to device, there is a potential that a playing and master device can become quite separated from a user that initiated the play. Further, takeover analysis can utilize resources of a device that could otherwise be concentrated on music play.

An alternative strategy is to use a more static master device. The master device can include a device where play was first initiated (e.g., a wearable device), a specified device (e.g., specified via a saved setting or setting received at input) or a remote system. Regardless of which device is selected, the designation can remain fixed throughout a given play session. The master device can coordinate play transfers by sending communications not only to a device that is to take over play but also to a device that is to cease play.

Figure 7:
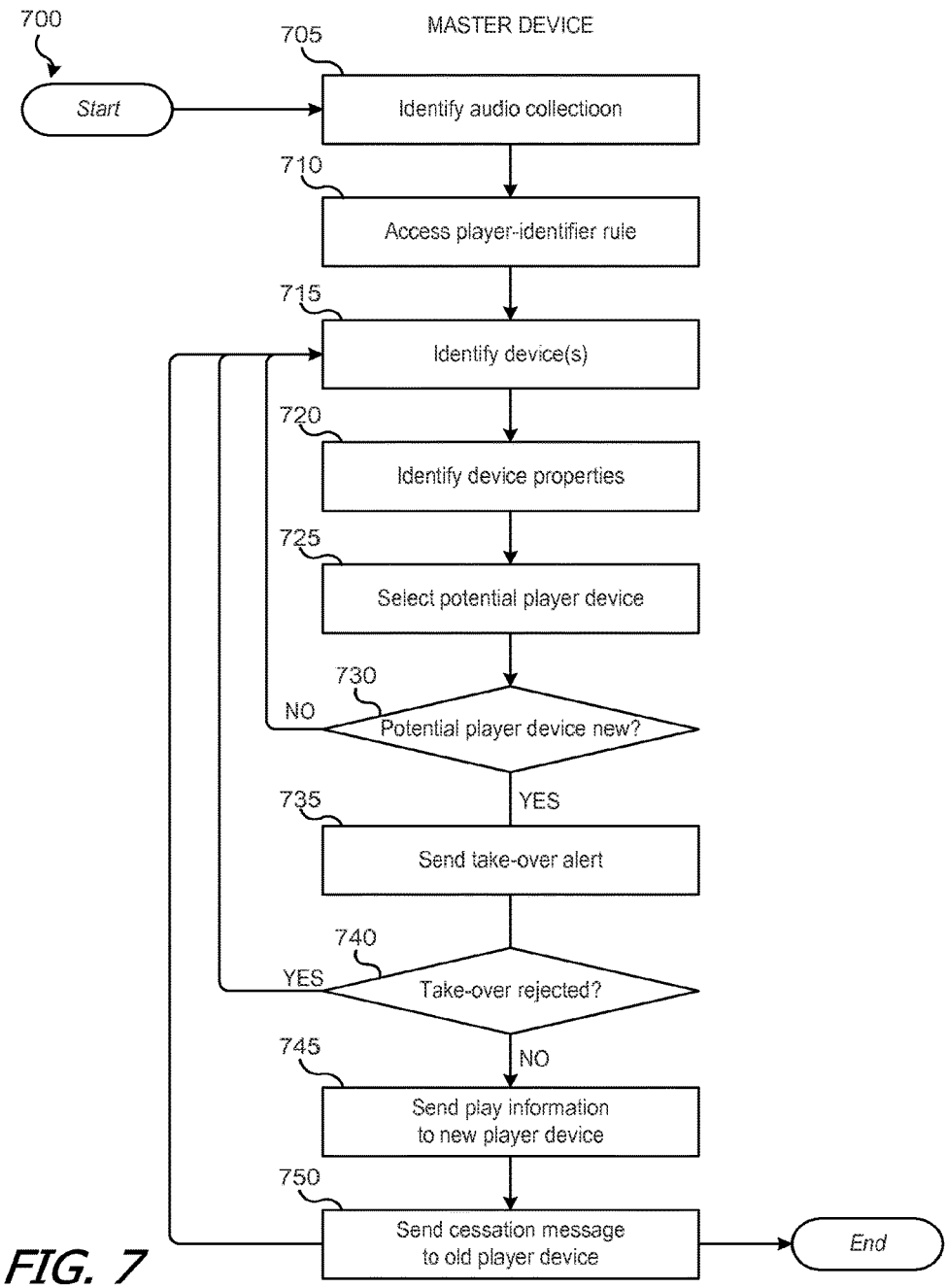
FIG. 7 is a flow diagram of a process for coordinating transfer of audio play between devices according to an embodiment of the present invention.

FIG. 7 is a flow diagram of a process 700 for coordinating, at a master device, transfer of audio play between devices according to an embodiment of the present invention. A master device can include any device that is configured to make determinations about device-playing actions, such as whether a play take-over is to occur, which device is to take over play, when the take-over is to occur, and/or whether play is continue. These determinations need not, in some embodiments, be final (e.g., a user can be able to overrule a proposed transfer) or even sufficient for a play take over (e.g., a user's approval can be required). In some embodiments, no such conditions are available, and take-overs automatically progress following their identification. A master-device designation can be fixed or transient. For example, in one instance, a master device can always be wearable device 300. In another instance, a master device is whichever device is playing music.

Blocks 705 and 710 of process 700 can correspond to blocks 605 and 610 of process 600. Generally, the master device can identify what is to be played (e.g., in response to an input corresponding to a play request) and accesses a rule indicating how to select which device is to play at least part of the audio collection.

At block 715, one or more devices can be identified. The identified devices can include a player device and can include the master device itself. The identified devices can include those within a geographic region (e.g., centered on a location of a device, such as a wearable device) or that are paired and connected (e.g., via a Bluetooth connection) to a playing device (e.g., a wearable device, a player device or the master device). In one instance, the identified devices can include those that respond to a broadcast communication sent by the master device. In one instance, the master device can send communication requests to each device in a set of devices (e.g., a set of paired devices), and the identified devices include those that respond to the requests.

At block 720, the master device can identify one or more properties for each identified device. The properties can be included in a communication sent from the device in response to a broadcast communication or communication request. The properties can include an indication as to the device's location, power source, battery charge, network connection strength, total processing power, current CPU usage and/or speaker inclusion. The properties can include information about song access, such as which songs, playlists or other audio collections are locally stored on the second device or which audio-collection remote data stores the device has access to.

At block 725, the master device can select one of the identified devices to be a potential player device. The selection can be made by assessing the identified properties using the rule. The assessment can involve a comparative assessment (e.g., comparing properties across multiple identified devices). In one instance, all identified devices can be simultaneously compared (e.g., by comparing a score). In one instance, comparisons are performed pair-wise (e.g., comparing each non-player device to a player device). A potential player device can then be identified as a first device to outperform the player device in the comparison or all such outperforming player devices can be subsequently compared.

At block 730, a determination can be made as to whether the selected potential player device is different from a current player device. When it is not, then process 700 can return to block 715 where device sets and properties can be monitored. The monitoring can continue immediately, after a fixed duration or upon receiving an alert (e.g., from a player device indicating that a property or playing score has fallen below a threshold).

When the selected potential player device is different from a current player device, process 700 continues to block 735 where a take-over alert is generated and caused to be presented. The alert can be presented to a user on an interface device and the alert (or information pertaining to the alert) can be sent to an interface device (e.g., if the interface device differs from the master device). For example, in one instance, the master device can cause an alert to be presented (e.g., via a player device or other device) to a user indicating that a play transfer is about to occur and identifying the potential player device. The alert can also include properties about the potential player device that caused it to be selected. The alert can include an opt-out option, such that the user can prevent the potential player device from taking over play.

At block 740, a determination is made as to whether a take-over by the potential player device has been rejected. The determination can depend on input from a user or lack thereof (e.g., identified based on a communication from an interface device). For example, a default can be that potential transfers are to be effected in the absence of any user instructions to the contrary.

When it is determine that the potential play transfer has been rejected, the master device can then terminate takeover preparations. Instead, process 700 can return to block 715 where device sets and properties can be monitored. The opt-out option can impose restrictions on future selections of potential player devices (e.g., permanently or within a play session), such as preventing a future selection of the previously selected device. (In even more extreme instances, a rejection can indicate that no transfer is to occur during a play session or globally, in which case process 700 terminates.)

When the proposed play transfer is not rejected, the master device can characterize the potential player device as being the new player device and can send it play information at block 745 (e.g., as described in corresponding block 640 in process 600). Further, the master device can send a cessation message to the old player device 750. The cessation message can include a time to stop playing music (or to fade away in its music play). Thus, the new player device can begin playing music as the old player device stops playing music. It will be appreciated that, if the master device is the old or new player device for a particular play-transfer process, a cessation or play-information communication can be omitted in favor of causing play to stop or to begin. Process 700 can then return to block 715 where device sets and properties can be monitored.

It will be appreciated that, in some instances, the potential player device can have the opportunity to reject a proposed play transfer. The master device can send a communication to the potential player device that is indicative of a plan or request to transfer play to the potential player device. This communication can be separate from or combined with one including the play information. In some instances, process 700 can require that the potential player device respond to the communication before proceeding with a play transfer plan. In some instances, process 700 can proceed with a play transfer plan so long as a rejection response is not received. Either such strategy can give the potential player device the opportunity to weight factors such as a current processing load, value rankings of tasks currently being processed, and/or access to songs.

Figure 8:
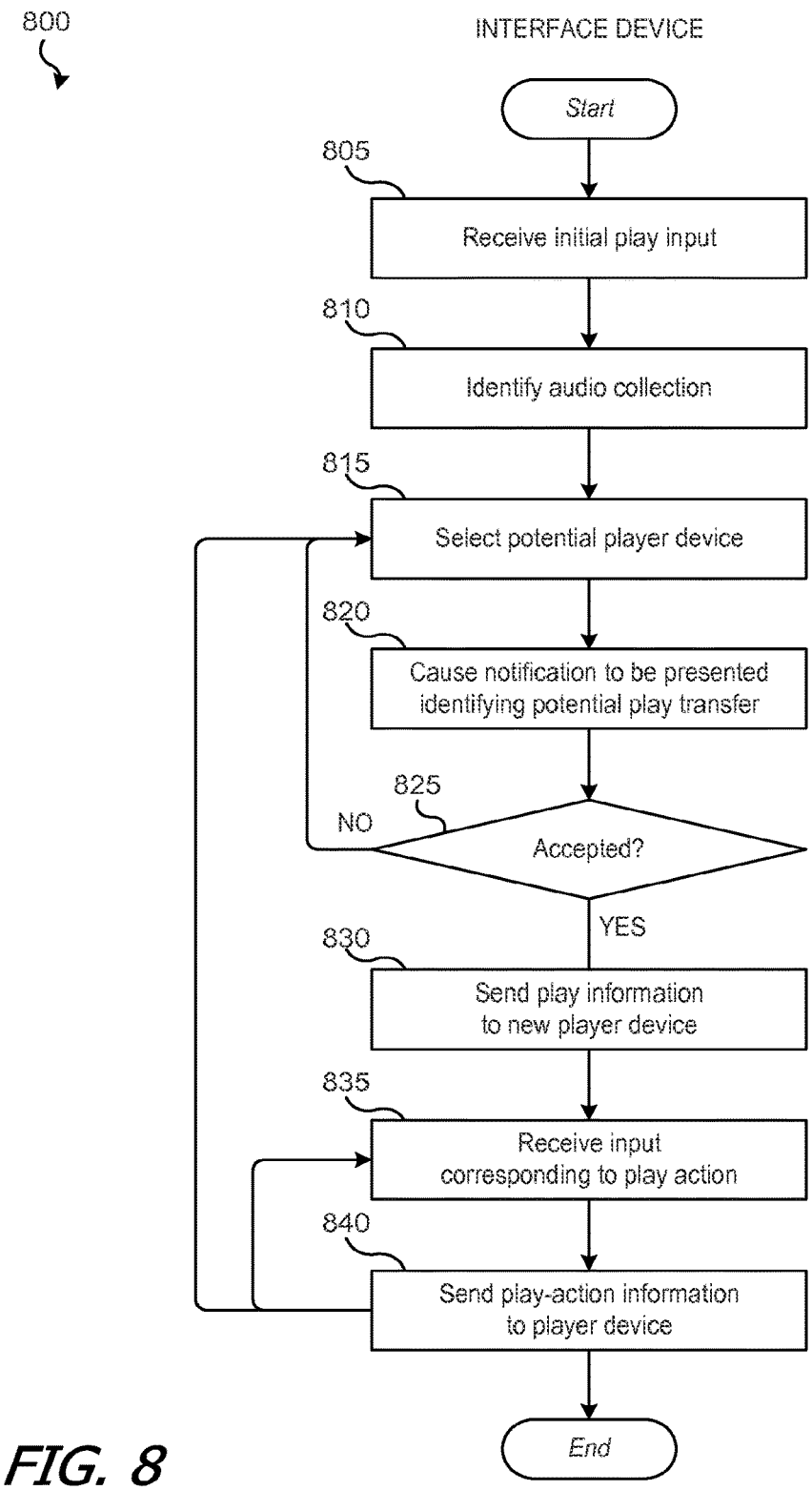
FIG. 8 is a flow diagram of a process for responding to play inputs in a distributed-device play network according to an embodiment of the present invention.

FIG. 8 is a flow diagram of a process 800 for responding to play inputs in a distributed-device play network according to an embodiment of the present invention. Process 800 can be implemented in one or more interface devices. An interface device can include any device that is to configured to receive and effect inputs controlling play of an audio collection. The interface device can, e.g., include a player device, a device at which play of an audio collection was initiated or another device in communication with a player device. In some instances, multiple interface devices exist within a local network of devices, such that each interface device is configured to receive input and communicate action commands with a player device playing an audio collection. For example, blocks 805-830 can be performed by a wearable device 300 and blocks 835-840 can be performed by mobile device 302.

At block 805, an interface device can receive initial play input. The input can correspond to a request to begin playing music. The input can identify particular music to be played (e.g., songs in a library, a stored playlist, or an online radio station) or constraints on music (e.g., a genre or artist).

An audio collection can be identified at block 810, which can correspond to block 605 of process 600 and/or block 705 of process 700. A potential player device can be identified at block 815. Analyses contributing to the selection can correspond to those discussed herein (e.g., with respect to block 635 of process 600 or block 725 of process 700).

At block 820, the interface device can cause a notification to be generated and presented that identifies a potential play transfer. The notification can identify a current player device and/or the potential player device. The notification can identify a speaker used by the current player device to play music and/or a speaker predicted to be used by the potential player device to play music. The notification can include one or more properties of each of the current player device and the potential player device (e.g., a battery charge, power source, location, and/or network connection strength). The notification can include an estimate as to a time duration during which the current player device will be able to continue play based on its battery charge.

The notification can include a user-input option, such that the user can accept and/or reject the potential play transfer. A default choice can be used absent a response (e.g., such that the potential transfer will be executed if not rejected or the converse). In some instances, a user can select an acceptance or rejection option on a screen and such input is transmitted back to the interface device.

The interface device can estimate whether the proposed play transfer has been accepted at block 825. In some instances, if the interface device has not received a rejection indication, it can assume that the potential play transfer was accepted.

When it is determined that the transfer was not accepted, process 800 can return to block 815 where devices can be monitored and, when appropriate, a new selection of a potential player device can be made.

When it is determined that the transfer was accepted, the interface device can characterize the potential player device as being the new player device and can send it play information at block 830 (e.g., as described in corresponding block 745 of process 700 and block 640 in process 600). The new player device can then take over play, as described herein.

At block 835, the interface device can receive an input corresponding to a play action. For example, the input can correspond to a play, fast-forward, skip, rewind, pause or stop command. As another example, the input can correspond to a selection of a playlist, genre, artist, song or position within a song.

Play-action information based on the input can be sent to a player device at block 840. In some instances, the interface device queries a master device to identify a current player device. In some instances, an identification of each new player device is received and stored at the interface device, such that it can determine the current player device. The player device can then control the play in accordance with the information. For example, music play can be appropriately stopped or resumed or a new song can be selected to play.

Thus, even though music play can dynamically transfer between devices, a user can continue to interact with a same device or any convenient device and play actions will be appropriately applied.

Structures of many audio collections offer predictability as to what particular audio segments will be played at a particular point in time. For example, if play of a 5-minute song begins at 1:00 pm, it can be predicted that at 1:02 pm, the play is 2 minutes into the song. Using this information, a transfer-coordinating device can provide play information that indicates where, within an audio collection, a post-transfer player device is to begin play. However, user-initiated play actions (e.g., song skips or pauses) or buffering can disrupt this predictability. Therefore, in some instances, a master device tracks actual play progress. The master device can thereafter be prepared to identify a play location to another device that will be taking over song play. The master device can track the progress by receiving communications from a player device (e.g., periodically identifying a play location or reporting a buffering delay or play action) and/or from an interface device (e.g., identifying any buffering or play action).

Figure 9:
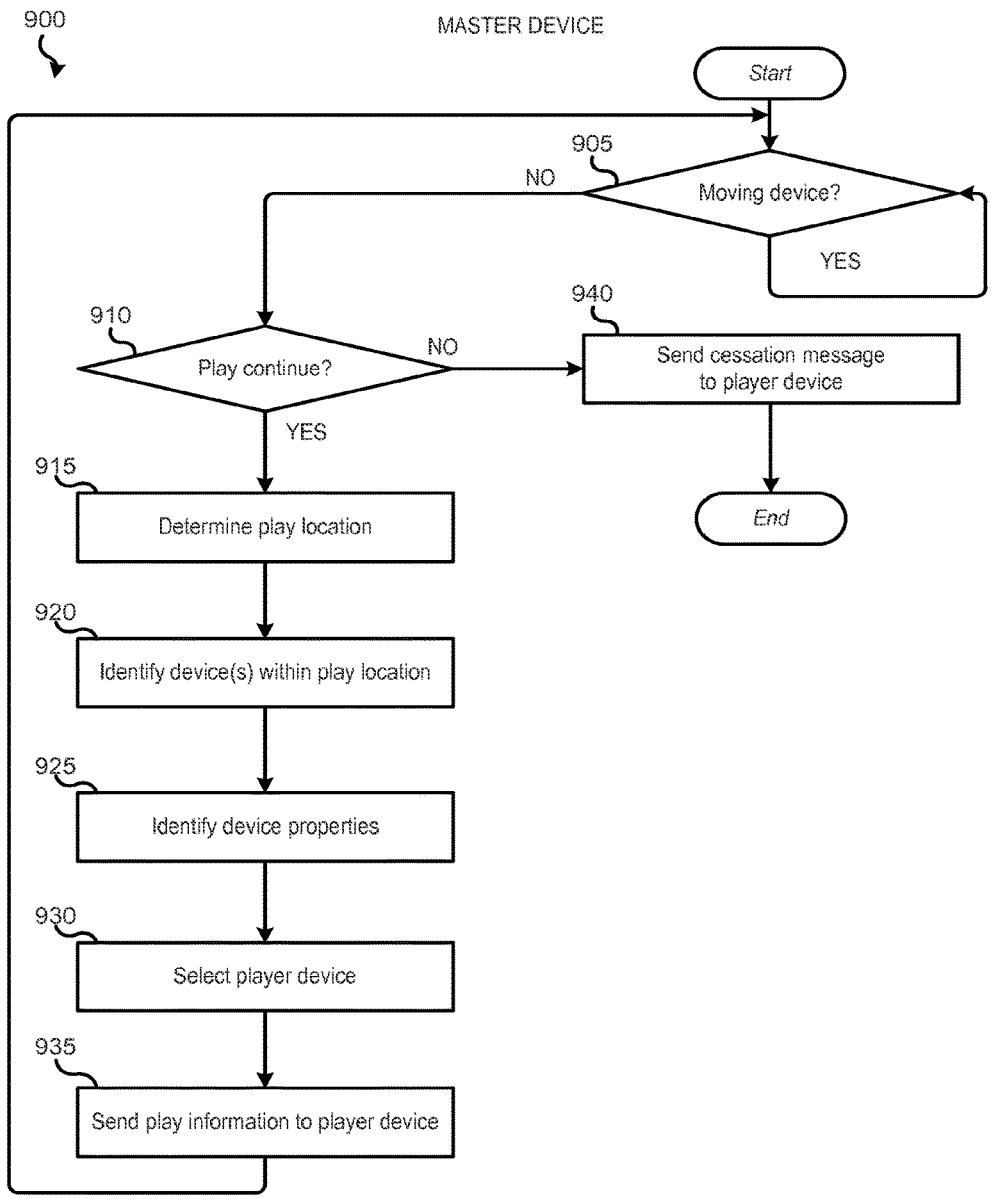
FIG. 9 is a flow diagram of a process for responding to device motion according to an embodiment of the present invention.

Play transfers can facilitate prolonged music-play sessions. However, as various devices move in and out of a particular area, a question arises as to where to maintain play. FIG. 9 is a flow diagram of a process 900 for responding to device motion according to an embodiment of the present invention. Part or all of process 900 can be implemented in a master device or a player device.

Process 900 begins at block 905 where a determination can be made as to whether a device is moving. The device being assessed can include a playing device, a device that initiated play, a wearable device or a mobile device, or any device communicating via a short-range connection (e.g., Bluetooth or BTLE) within a paired network playing music. The assessment can include using a reading of a sensor, such as an accelerometer or GPS receiver. The assessment can include using a connection strength. Thus, for example, two devices or a device and a speaker can be connected via a Bluetooth connection. Changes in the connection strength can be indicative of movement. The change can be detected at a moving device or at a device paired with the moving device.

If no movement is detected, then a current player device and/or normal take-over assessments can be performed. If it is determined that a device is moving, then a determination can be made as to whether play is to continue at block 910.

The play-continuation determination can be based on application of a rule. The rule can identify a play-continuing outcome that depends on one or more of what type of device is moving (e.g., a tablet, a wearable device, etc.), whether the moving device initiated the play, whether the moving device is a current player device, whether (and/or how many) other paired devices are in communication with a speaker, whether a speaker currently playing music is the same speaker that played music initially during the play session and a duration of the play session that has occurred. For example, a rule can specify that play is to continue so long as another paired device remains connected to a speaker that output music initially during a play session.

The play-continuation determination can be based on a user preference. The preference can include, e.g., a setting that generally applies to play situations or an input. For example, after detecting that a device is moving, the master device can cause a notification to be presented via device interface (e.g., an interface of a moving device or a master device). A user can then respond to the notification with a request to terminate the play session or to continue play, in which case the user can (in some instances) even identify which device is to play music.

When it is determined to continue play, a play location can be determined at block 915. The play location need not be a geographical location but can rather be relative to a device. That is, in some instances, an affirmative response to block 905 can indicate that one device is moving away from another device. The question then becomes whether play is to follow the moving device or to stay with the stationary device. The determination can depend on one or more of what type of device is moving (e.g., a tablet, a wearable device, etc.), which device initiated the play (e.g., a device that is now moving or one that is stationary), whether the moving device is a current player device, whether a speaker is moving, whether (and/or how many) other paired devices are in communication with a speaker, whether a speaker currently playing music is the same speaker that played music initially during the play session and a duration of the play session that has occurred. For example, a play location can follow the moving device if it initiated the play and/or if a speaker is moving with the moving device. In some instances, the play location is determined based on user input (e.g., identifying a device that is to play music).

At block 920, one or more devices within the play location are identified. In one instance, the play location includes the location of a particular device. The devices identified at block 920 include devices that are paired to the particular device and that are connected via a short-range connection (e.g., Bluetooth or BTLE).

Blocks 925, 930 and 935 can correspond to blocks 720, 725 and 745 in process 700. Generally, a player device can be selected from amongst the identified devices based on device properties and a rule (e.g., favoring devices with a longest remaining charge time). If the selected device differs from a current player device, play information can be caused to be transmitted to the selected player device at block 935.

The following examples provide illustrations of how devices can interact to facilitate continuous music play.

Example 1

On a wearable device, a user can initiate play of a playlist. Both the playlist and songs of the playlist can be stored on the cloud. The wearable device can access the cloud and begin transmitting songs from the playlist to a wireless independent speaker. The wearable device can send out a broadcast signal to detect other devices. A nearby plugged-in tablet device can receive the signal and respond with its properties (e.g., that it is a tablet and that it has an AC power source). A rule can indicate that play is to transfer to any responsive device with an AC power source. The wearable device can thus determine that play is to transfer to the tablet. The wearable device can send a play-transfer communication to the tablet, identifying the playlist, a position within the playlist, a take-over time and a volume setting. The tablet can then begin playing at the position at the take-over time. It can adjust its volume setting appropriately such that volume of played songs matches that from the wearable device's play.

At the take-over time, the wearable device can stop playing the playlist. However, the wearable device can continue to receive input (e.g., user input) corresponding to a request for a play action and transmit indications of any such actions to the tablet such that they can be implemented.

Example 2

Following Example 1, the tablet can begin moving and approach an edge of a speaker's range. The tablet can detect a weakening connection and/or motion and can alert the wearable device (e.g., due to it being a master device or a play-initiation device) that it is about to go out of the speaker's range. The alert can identify a position within the playlist and a near-term play-transfer time. At the near-term play-transfer time, the tablet can stop play and the wearable device can begin transmitting music corresponding to the position in the playlist to the wireless speaker.

Example 3

Following Example 1, the wearable device can begin moving and approach an edge of a speaker's range. The wearable device can detect a weakening connection and/or motion and can alert the tablet (e.g., due to it being a player device) that it is about to go out of the speaker's range. An alert can be presented on one or both of the wearable device or tablet indicating that play will continue using the tablet unless an objection is received. If no objection is received, the tablet can continue its play. The wearable device can then stop accepting inputs pertaining to the play.

Example 4

Following Example 1, the tablet can detect a weakening connection with the wearable device. The tablet can send a play-transfer request with a position within the playlist and a near-term play-transfer time to the wearable device. At the near-term play-transfer time, the tablet can stop play and the wearable device can begin transmitting music corresponding to the position in the playlist to the wireless speaker.

Embodiments of the present invention can facilitate user interaction with one or more devices by providing a user with prolonged music play by capitalizing on capabilities from a combination of devices. While a particular device can be convenient for a user to interact with, it can lack the hardware or network connection needed to sustain continuous music play. Meanwhile, techniques described herein can silently recruit one or more other devices to participate in the requested play to thereby gain both the use convenience of the user-interacting device and the battery power or network connection of another device. While some embodiments provide a user (via an interface) with notifications of play transfers and the opportunity to reject any such transfer, a benefit of the technique is that it can occur automatically, silently and repeatedly. Thus, a user need not be involved in every device transfer and can instead merely enjoy extended music play While the invention has been described with respect to specific embodiments, one skilled in the art will recognize that numerous modifications are possible. For example, different sensors or combinations of sensors can be substituted for those described herein. A variety of different mobile devices and wearable devices can be used.

Embodiments described above assume that a pairing or other connection has been established that enables the devices to recognize each other as being authorized for interoperation. This can reduce the likelihood that a device will be automatically activated or used as a player device as a result of communicating with a device not authorized by the user. For additional security, the communication session established between the devices can be made secure.

Some embodiments depicted or described herein relate to a simplistic, banded smart wearable device. It will be appreciated that the embodiments can be modified to pertain to other devices, such as a mobile device or a wearable device (e.g., smart glasses, a smart earpiece, smart headphones, a smart watch, a smart armband and the like).

It will be appreciated that techniques described herein can be applied beyond the scope of playing music. As one example, embodiments can extend to inter-device coordinated play of any audio collection (e.g., an audio book or a podcast). As another example, embodiments can extend to inter-device coordinated play of a video collection. A user can initiate play of a movie on his wearable device. The wearable device can identify the movie (e.g., from a local storage, remote storage, stream, etc.); retrieve, download or receive part or all of the movie; and output the movie to a television or projector. The wearable device can then transfer play of the movie to another device, which can output it to a same television or projector. As yet another example, embodiments can extend to inter-device coordinated processing. To illustrate, a processing request for performance of a heavy computational task can be transferred to another device with a more powerful processor, parallel-processing capability, a bigger (remaining or total) battery size and/or a stable power source (e.g., an AC source). As another illustration, a processing request can be transferred to another device with access to software to efficiently respond to the request.

The foregoing description may make reference to specific examples of a wearable device and/or a mobile device (e.g., a mobile phone or smart phone). It is to be understood that these examples are illustrative and not limiting; other devices can be substituted and can implement similar functional blocks and/or algorithms to perform operations described herein and/or other operations. Further, some or all of the player devices can be non-wearable and/or non-mobile.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:
1. A method comprising:
   identifying, at a first device, an audio collection that includes one or more songs;
   determining that the first device comprises a player device;

coordinating, at the first device, play of a song of the one or more songs by transmitting, from the first device and to a speaker, audio data from the audio collection, the audio data corresponding to the song;

accessing, at the first device, a rule that indicates whether another device is to take over as the player device;

determining, by the first device and while the first device is coordinating play of the song, that a second device is to take over as the player device based on a property of the second device and the accessed rule, the property indicating a type of power source, a battery charge, a network connection accessibility, a network connection strength, a hierarchical position associated with the second device, a location, and/or an accessibility of the song; and sending, from the first device and to the second device, one or more specifications of takeover of the transmission of the audio data from the audio collection to the speaker, wherein the one or more specifications identify at least the song and a takeover play position within the song at which, upon taking over, the second device is to begin play of the song, wherein current play of the song coordinated by the first device corresponds to current play position that is before the takeover play position within the song; and ceasing, at a time corresponding to the takeover play position, transmission from the first device of the audio data.

2. The method of claim 1 wherein the property indicates the network connection strength of the second device.

3. The method of claim 1 further comprising evaluating the rule based on the property, wherein evaluating the rule includes assessing a property of the first device that corresponds to the property of the second device.

4. The method of claim 1 further comprising:
detecting, by the first device, a plurality of second devices, wherein the plurality of second devices includes the second device; and
identifying, for each of the plurality of second devices, a property of the second device, and
wherein the determination that the second device is to take over as the player device includes selecting the second device from amongst the plurality of second devices based on each of the properties of the second devices.

5. The method of claim 1 wherein the first device includes a wearable device.

6. The method of claim 1 wherein the one or more specifications of the takeover of the transmission of the audio data includes an identification of the audio collection or an identification of the song.

7. The method of claim 1 wherein the second device includes:
a display; and
a storage subsystem that stores an operating system and one or more applications.

8. A method comprising:
identifying, at a master device, a dynamic set of devices, wherein each of the dynamic set of devices is within a same area and has a capability to transmit audio data to a speaker, wherein each device in the dynamic set of devices is different than the master device;
identifying, at the master device, a first device of the dynamic set of devices that comprises a player device that is coordinating play of a song by transmitting audio data from an audio collection to a speaker, the audio data corresponding to the song;
determining, at the master device and while the first device is coordinating play of the song, that a second device of the dynamic set of devices is to take over as the player device; and
sending, from the master device and to the second device, an instruction communication that includes one or more specifications of takeover of the transmission of the audio data from the audio collection to the speaker, wherein the one or more specifications identify at least a takeover play position within the audio collection, the takeover play position being within the song, wherein current play of the song coordinated by the first device corresponds to current play position that is before the takeover play position within the song, and wherein the instruction communication indicates that the second device is to initiate play of the song at the takeover play position.

9. The method of claim 8 wherein the dynamic set of devices includes the master device.

10. The method of claim 8 further comprising, upon determining that the second device is to take over as the player device:
sending, from the master device and to the first device, an indication to cease transmission of the audio data from the audio collection to the speaker.

11. The method of claim 8 wherein the determination that the second device is to take over as the player device is made based on a property of one or both of the first device and the second device, and wherein the property is indicative of a hierarchical position associated with the one or both of the first device and the second device.

12. The method of claim 8 wherein the determination that the second device is to take over as the player device is made based on a property of the first device and a corresponding the property of the second device.

13. The method of claim 8 further comprising:
identifying, for each device in the set of devices, a set of properties of the device; and
calculating, for each device in the set of devices and at the master device, a score based on the set of properties of the device,
wherein the determination that the second device of the dynamic set of devices is to take over as the player device is made based on a comparison of the calculated scores.

14. The method of claim 8 further comprising:
repeatedly monitoring, at the master device, a property for at least one device in the set of devices; and
repeatedly determining, at the master device, which device in the set of devices is to be the player device.

15. The method of claim 8 wherein the dynamic set of devices includes a wearable device.

16. The method of claim 8 wherein the one or more specifications of the takeover of the transmission of the audio data includes an identification of the audio collection or an identification of the song.

17. An electronic device comprising:
an input component configured to receive inputs from a user;
an output component configured to transmit audio data;
one or more processors coupled to the input component and to the output component; and
a computer-readable storage medium containing instructions, that, when executed by the one or more processors, cause the one or more processors to:
identify an audio collection that includes one or more songs;

determine that the electronic device comprises a player device;

coordinate play of a song of the one or more songs by transmitting audio data from the audio collection to a speaker, the audio data corresponding to the song;

access a rule that indicates whether another device is to take over as the player device;

determine that a second device is to take over as the player device based on a property of the second device and the accessed rule, the property indicating a type of power source, a battery charge, a network connection accessibility, a network connection strength, a hierarchical position associated with the second device, a location, and/or an accessibility of the song;

send, to the second device, one or more specifications of takeover of the transmission of the audio data from the audio collection, wherein the one or more specifications identify at least a time point within the song at which the second device is to take over as the play device, wherein the time point is after a current time point within the song associated with current transmission of the audio data to the speaker; and cause transmission of the audio data from the electronic device to the speaker to cease.

18. The electronic device of claim 17 wherein the instructions, when executed by the one or more processors, further cause the one or more processors to evaluate the rule based on the property, and wherein evaluating the rule includes assessing a property of the electronic device that corresponds to the property of the second device.

19. The electronic device of claim 17 wherein the instructions, when executed by the one or more processors, further cause the one or more processors to:

detect a plurality of second devices, wherein the plurality of second devices includes the second device;

identify, for each of the plurality of second devices, a property of the second device, and wherein the determination that the second device is to take over as the player device includes selecting the second device from amongst the plurality of second devices based on each of the properties of the second devices.

20. The electronic device of claim 17 wherein the electronic device includes a wearable device.

21. The electronic device of claim 17 wherein the one or more specifications of the takeover of the transmission of the audio data includes an identification of the audio collection or an identification of the song.

22. The electronic device of claim 17 wherein the property indicates a current connection accessibility.

23. A master electronic device comprising:

one or more processors; and a computer-readable storage medium containing instructions, that, when executed by the one or more processors, cause the one or more processors to:

identify a dynamic set of devices, wherein each of the dynamic set of devices is within a same area and has a capability to transmit audio data to a speaker;

identify a first device of the dynamic set of devices that comprises a player device that is coordinating play of a song by transmitting audio data from an audio collection to a speaker, the audio data corresponding to the song;

determine, while the first device is coordinating play of the song, that a second device of the dynamic set of devices is to take over as the player device, wherein each of the first device and the second device is different than the master electronic device; and send, to the second device, one or more specifications of takeover of the transmission of the audio data from the audio collection, the one or more specifications including at least an intra-song time of the song to facilitate the second device taking over the play of the song at the intra-song time, wherein the one or more specifications are sent before the transmission of the audio data has reached the intra-song time during the play of the song.

24. The master electronic device of claim 23 wherein the dynamic set of devices includes the master electronic device.

25. The master electronic device of claim 23 wherein the instructions, when executed by the one or more processors, further cause the one or more processors to:

upon determining that the second device is to take over as the player device, send, to the first device, an indication to cease transmission of the audio data from the audio collection to the speaker.

26. The master electronic device of claim 23 wherein the determination that the second device is take over as the player device is made based on comparing a property of the first device with a corresponding property of the second device, and wherein each of the property and the corresponding property is indicative of a type of power source or a device type.

27. The master electronic device of claim 23 wherein the determination that the second device is take over as the player device is made based on a property of the first device and a corresponding property of the second device.

28. The master electronic device of claim 23 wherein the instructions, when executed by the one or more processors, further cause the one or more processors to:

identify, for each device in the set of devices, a set of properties of the device; and calculate, for each device in the set of devices and at the master electronic device, a score based on the set of properties of the device, wherein the determination that the second device of the dynamic set of devices is to take over as the player device is made based on a comparison of the calculated scores.

29. The master electronic device of claim 23 wherein the instructions, when executed by the one or more processors, further cause the one or more processors to:

repeatedly monitor a property for at least one device in the set of devices; and repeatedly determine which device in the set of devices is to be the player device.

30. The master electronic device of claim 23 wherein the dynamic set of devices includes a wearable device.

31. The master electronic device of claim 23 wherein the one or more specifications of the takeover of the transmission of the audio data includes an identification of the audio collection or an identification of the song.

* * * * *